(12) United States Patent
    Hill

(10) Patent No.: US 10,849,312 B2
(45) Date of Patent: Dec. 1, 2020

(54) PET FEEDERS

(71) Applicant: SureFlap Ltd, Cambridge (GB)

(72) Inventor: Nicholas Patrick Roland Hill, Cambridge (GB)

(73) Assignee: SureFlap Ltd, Cambridge (GB)

( * ) Notice: Subject to any disclaimer, the term of this patent is extended or adjusted under 35 U.S.C. 154(b) by 349 days.

(21) Appl. No.: 14/914,594

(22) PCT Filed: Aug. 28, 2014

(86) PCT No.: PCT/GB2014/052597
§ 371 (c)(1),
(2) Date: Feb. 25, 2016

(87) PCT Pub. No.: WO2015/028794
PCT Pub. Date: Mar. 5, 2015

(65) Prior Publication Data
US 2016/0212971 A1    Jul. 28, 2016

(30) Foreign Application Priority Data

Aug. 30, 2013 (GB) .................................. 1315484.4

(51) Int. Cl.
*A01K 5/02* (2006.01)
*A01K 5/01* (2006.01)
*A01K 11/00* (2006.01)

(52) U.S. Cl.
CPC .......... *A01K 5/0283* (2013.01); *A01K 5/0114* (2013.01); *A01K 5/0135* (2013.01);
(Continued)

(58) Field of Classification Search
CPC ...... A01K 5/0114; A01K 5/0142; A01K 5/02; A01K 5/0225; A01K 5/0291
(Continued)

(56) References Cited

U.S. PATENT DOCUMENTS

| 845,982 A | 3/1907 | Smith |
|---|---|---|
| 1,756,135 A | 4/1930 | Ruskin |

(Continued)

FOREIGN PATENT DOCUMENTS

| AU | 2003239832 A1 | 11/2003 |
|---|---|---|
| CN | 202999020 U | 6/2013 |

(Continued)

OTHER PUBLICATIONS

Great Britain Search Report, dated Feb. 14, 2014, from corresponding Great Britain Application No. 1315484.4.
(Continued)

*Primary Examiner* — David J Parsley
(74) *Attorney, Agent, or Firm* — Wolf, Greenfield & Sacks, P.C.

(57) ABSTRACT

This invention generally relates to animal feeders, an animal feeding monitor and a method of training an animal to use a feeder. An animal feeder may have a housing with an aperture for a food bowl and a door for covering the aperture. The feeder can further include a door mechanism to control movement of the door over the aperture and a sensor to detect when an animal has moved away from the aperture. The feeder is configured to be operable in a training mode wherein the door mechanism is operable to control the door to cover a portion of the aperture in response to the detection and to respond to one or more later detections by controlling the door to cover a portion of the aperture larger than the preceding portion.

14 Claims, 17 Drawing Sheets

(52) U.S. Cl.
CPC .............. *A01K 5/0142* (2013.01); *A01K 5/02* (2013.01); *A01K 5/0291* (2013.01); *A01K 11/006* (2013.01)

(58) Field of Classification Search
USPC .................................. 119/51.02, 51.11, 51.12
See application file for complete search history.

(56) References Cited

U.S. PATENT DOCUMENTS

| | | | |
|---|---|---|---|
| 2,157,682 A * | 5/1939 | Sweeny | A01K 5/0291 |
| | | | 119/51.15 |
| 2,659,345 A | 11/1953 | Herbert | |
| 3,025,947 A | 3/1962 | Hammer | |
| 3,121,419 A | 2/1964 | Gillespie | |
| 3,176,656 A | 4/1965 | Bates | |
| 3,301,219 A | 1/1967 | Hellekson | |
| D217,060 S | 3/1970 | Wilson | |
| 3,532,075 A * | 10/1970 | Cooper | A01K 5/0291 |
| | | | 119/51.12 |
| 3,541,995 A | 11/1970 | Fathauer | |
| 3,599,608 A | 8/1971 | Esquival | |
| 3,651,787 A | 3/1972 | Cooper | |
| D232,103 S | 7/1974 | Suzuki | |
| 4,175,516 A | 11/1979 | Savage | |
| D257,692 S | 12/1980 | Thayer | |
| D260,043 S | 7/1981 | Robinson | |
| D269,045 S | 5/1983 | Easton | |
| 4,389,976 A | 6/1983 | Novak | |
| D270,672 S | 9/1983 | Zelinger | |
| 4,467,920 A | 8/1984 | Smith | |
| 4,572,108 A * | 2/1986 | Daifotes | A01K 1/0005 |
| | | | 119/51.01 |
| D289,127 S | 4/1987 | Blumenthal | |
| D289,570 S | 4/1987 | Hageney | |
| 4,793,290 A | 12/1988 | O'Donnell | |
| D299,768 S | 2/1989 | Windom | |
| D302,755 S | 8/1989 | Zaliti | |
| 5,105,763 A | 4/1992 | Poiesz et al. | |
| 5,349,925 A | 9/1994 | Zerato et al. | |
| D359,594 S | 6/1995 | Macri | |
| D360,497 S | 7/1995 | Lewis et al. | |
| 5,649,499 A | 7/1997 | Krietzman et al. | |
| 5,669,328 A * | 9/1997 | Lanfranchi | A01K 5/02 |
| | | | 119/51.12 |
| 5,794,565 A | 8/1998 | Beshah | |
| D423,734 S | 4/2000 | Dahl | |
| D432,370 S | 10/2000 | Phetthaweebancha | |
| 6,349,671 B1 | 2/2002 | Lewis et al. | |
| D455,076 S | 4/2002 | Gumper | |
| 6,446,574 B2 | 9/2002 | Bickley | |
| 6,557,489 B2 | 5/2003 | King | |
| D478,693 S | 8/2003 | Steinbacher | |
| 6,622,656 B1 | 9/2003 | Splane | |
| D490,577 S | 5/2004 | Steinbacher et al. | |
| D502,294 S | 2/2005 | Hung | |
| D503,336 S | 3/2005 | Tucker et al. | |
| D506,854 S | 6/2005 | Baker | |
| 7,073,461 B2 | 7/2006 | Gonet | |
| 7,124,707 B1 | 10/2006 | Clarke | |
| 7,228,816 B2 * | 6/2007 | Turner | A01K 5/0114 |
| | | | 119/51.02 |
| 7,296,539 B2 | 11/2007 | Iljas | |
| D561,407 S | 2/2008 | Dixon | |
| 7,395,782 B1 | 7/2008 | Lindsay | |
| D580,110 S | 11/2008 | Tsengas | |
| 7,458,336 B2 | 12/2008 | Eu | |
| 7,469,657 B2 | 12/2008 | Drummond | |
| D602,652 S | 10/2009 | Horvath | |
| 7,685,966 B2 * | 3/2010 | Goehring | A01K 5/0114 |
| | | | 119/51.02 |
| 7,874,265 B1 * | 1/2011 | Addleman | A01K 5/025 |
| | | | 119/59 |
| 7,895,973 B1 * | 3/2011 | Whelan | A01K 5/025 |
| | | | 119/51.02 |
| D649,869 S | 12/2011 | Gibson et al. | |
| 8,082,881 B2 | 12/2011 | Lush | |
| 8,100,084 B1 * | 1/2012 | Abramson | A01K 5/0283 |
| | | | 119/51.02 |
| 8,161,911 B2 * | 4/2012 | Jalbert | A01K 1/0107 |
| | | | 119/501 |
| D681,885 S | 5/2013 | Pitter | |
| 8,656,862 B2 | 2/2014 | Manickchan et al. | |
| 9,332,729 B1 * | 5/2016 | Hyle | A01K 5/02 |
| 2002/0134313 A1 | 9/2002 | King et al. | |
| 2004/0182326 A1 | 9/2004 | Polimeni, Jr. | |
| 2005/0061252 A1 | 3/2005 | Meeks et al. | |
| 2005/0115508 A1 | 6/2005 | Little | |
| 2005/0217591 A1 | 10/2005 | Turner et al. | |
| 2005/0279287 A1 | 12/2005 | Kroeker | |
| 2006/0032451 A1 | 2/2006 | Gonet | |
| 2006/0201436 A1 | 9/2006 | Kates | |
| 2006/0207515 A1 | 9/2006 | Palett et al. | |
| 2006/0236948 A1 | 10/2006 | Wechsler | |
| 2008/0035241 A1 | 2/2008 | Wittbold | |
| 2008/0105205 A1 | 5/2008 | Goehring | |
| 2009/0095223 A1 | 4/2009 | Szutu | |
| 2010/0139570 A1 * | 6/2010 | Pfingsten | A01K 5/0142 |
| | | | 119/63 |
| 2010/0147226 A1 | 6/2010 | Tsengas | |
| 2010/0170448 A1 | 7/2010 | Warwick et al. | |
| 2011/0146580 A1 | 6/2011 | Jalbert et al. | |
| 2012/0299731 A1 | 11/2012 | Triener | |
| 2014/0290584 A1 | 10/2014 | Jones | |
| 2014/0347184 A1 | 11/2014 | Triener | |
| 2015/0130617 A1 | 5/2015 | Triener | |
| 2016/0360733 A1 | 12/2016 | Triener | |
| 2019/0029226 A1 | 1/2019 | Triener | |

FOREIGN PATENT DOCUMENTS

| | | |
|---|---|---|
| DE | 198 26 348 A1 | 1/1999 |
| EP | 0 938 841 A1 | 9/1999 |
| GB | 2360689 A | 10/2001 |
| GB | 2451804 A | 2/2009 |
| WO | WO 2005/096808 A1 | 10/2005 |
| WO | WO 2009/090426 A2 | 7/2009 |
| WO | WO 2010/091686 A1 | 8/2010 |

OTHER PUBLICATIONS

International Search Report and Written Opinion, dated Jun. 24, 2015, from a corresponding International Application No. PCT/GB2014/052597.

First Office Action for Chinese Application No. 201480059456.3, dated Jul. 4, 2018.

* cited by examiner

PET FEEDERS

CROSS-REFERENCE TO THE RELATED APPLICATIONS

This application is the national phase of International Application No. PCT/GB2014/052597, titled "PET FEEDERS", filed on Aug. 28, 2014, which claims priority to United Kingdom Patent Application No. 1315484.4, titled "PET FEEDERS", filed on Aug. 30, 2013, both of which applications are incorporated herein by reference in their entireties.

FIELD OF THE INVENTION

This invention generally relates to animal feeders, an animal feeding monitor and a method of training an animal to use a feeder.

BACKGROUND TO THE INVENTION

Feeders that open for an animal or a specifically identified animal, e.g., wearing an electronic collar tag or with an RFID implant, are known in the prior art.

A feeder may work on either a collar mounted electronic tag or an RFID implant in the animal. A loop antenna may be situated to optimise the readability of the RFID tag, including the animal or RFID tag poking through the antenna as it approaches for feeding. In an improved feeder, the antenna may be arranged close to the tag in the animal on its approach. Another feeder may recognise a pet's RFID implant and control a door over a food bowl.

An enclosed feeder with restricted entry from the front can allow feeding of the specific pet and restricting access from other animals coming in from the side to steal food. While this is a beneficial result, the pet may be required to poke their head into an enclosed box which can be a frightening experience, particularly if they cannot see around where other animals in the house might be.

Thus, there is a need for example for an improved feeder that has an open design, allowing the feeding animal to see around, while restricting access from other animals to steal food.

Another issue with feeding animals concerns feeding multiple times in one day: food can dry out and go off, and is then rejected by the pet. It can also generate difficulties with flies and undesirable odours. A feeder that for example provides an air tight seal for the food while not in use therefore seems desirable, however an air tight feeder generally results in the pet not having the smell of the food to attract them and indicate there is food present. Thus a feeder may deliberately have air holes over the food to allow the pet to smell the food as otherwise pet animal may not naturally approach to eat from the food.

Further issues may be associated with a feeder that uses a door or lid over a food bowl to restrict access. For example, the door could possibly close on the animal's paw and lead to injury. An arrangement having a sliding door driven via a spring to allow a paw to be removed from the door, avoiding injury, may lead to a bulky design as a lot of space is required for the mechanism. An alternative is a hinged lid, however if hinged at the back of the unit this can hit the pet on the bottom of their chin as they approach the bowl. There is therefore a need for a more compact design of door that does not hit the pet on the bottom of the chin and is also designed to avoid any possible injury to the pet if it is closed on their paw.

Furthermore, a conventional feeder is unable to provide the owner information on the feeding of their pet for, e.g., animal weight control or some other medical requirement.

A feeder may comprise pet proximity detectors. Such sensors however may suffer from blocking with food, depending on their location.

In view of the above, the field of animal feeding thus continues to provide a need for, a feeding apparatus that may have one or more advantage(s) such as, inter alia, selective operation, e.g., allows access only by authorised animals; allows a feeding animal to see around while restricting access by other animals; keeps food fresh for longer; reduces risk of food being eaten by intruder pets; reduces odour from feeder; assists training a pet in how to use the product; easy to clean; compact feeder size; reduced risk of hitting, trapping and/or injuring the pet; remote (preferably over the internet) control and/or monitoring, e.g., of food delivered and/or consumed; reduced delay in allowing access to food; allows different food delivery to different animals having access to the feeder; ease of feeding and/or cleaning by animal owner; reliable operation; low cost; easier manufacture; etc.

For use in understanding the present invention, the following disclosures are referred to:

U.S. Pat. No. 3,541,995;
U.S. Pat. No. 5,105,763;
U.S. Pat. No. 7,458,336;
WO2009090426;
U.S. Pat. No. 7,124,707;
U.S. Pat. No. 7,685,966;
U.S. Pat. No. 7,073,461; and
US2002/0134313.

SUMMARY

According to a first aspect of the present invention, there is provided an animal feeder having a housing comprising an aperture for a food bowl and having a door for covering the aperture, the feeder comprising a door mechanism to control movement of the door over the aperture, wherein the feeder comprises a sensor to detect when an animal has moved away from the aperture, and the feeder is configured to be operable in a training mode wherein the door mechanism is operable to control the door to cover a portion of the aperture in response to a said detection and to respond to one or more later said detections by controlling the door to cover a portion of the aperture larger than the preceding said portion.

Such a feeder may be suitable for a pet animal such as a cat, dog, rabbit, rodent (e.g., gerbil, hamster, chinchilla or guinea pig), bird (e.g., a canary, parakeet or parrot), reptile (e.g., turtle or lizard), etc. Advantageously, the feeder may be able to train the animal to not be frightened to eat from the feeder in spite of the door movements. In particular, the animal may be disturbed or frightened by a closing door. Additionally or alternatively, where the feeder contains food in an air-tight enclosure, for example a food bowl sealed by the door, so that the animal cannot smell the food when the door is not open, the training mode may advantageously train the animal in how to use the feeder.

In an embodiment, a portion covered by the door in response to consecutive detections may be the same, i.e., the covered portion may not be increased on every one of a series of detections. For example, after any increase in a covered portion, the animal may eat twice or more at the feeder with the door opening on each arrival and partially closing on each departure of the animal, without any change in the extent to which the door closes. Thus, each increase in the coverage by the door may occur only when the pet has become comfortable with a current coverage. Preferably, at least one of the covered portions comprises the previous covered portion so that each larger portion is an extension of the previous portion.

The housing may comprise the bowl, e.g., as a molding in the housing (for example a shape molded into plastic casework of the housing), or may be provided without the bowl such that a separately provided bowl can be inserted. Thus, for example, the feeder may have a food bowl having the aperture for access to food in the bowl (the aperture defined by the bowl rim), or the feeder may have an aperture sized to receive a separate food bowl (which may be disposable and/or removable) so that the animal can access food in the bowl through the aperture. Regardless, when the door covers the aperture as described above, preferably the aperture and/or food bowl are fully covered.

In an arrangement, the movement away from the aperture may be alternatively described as a movement away from the feeder and/or away from a food bowl of the feeder.

The door mechanism may control the door to automatically uncover the aperture (preferably fully) each time a sensor indicates that an animal has arrived at the feeder. Similarly, each movement of the door to cover a portion of the aperture in response to a detection that the animal has moved away is preferably automatic.

Preferably, a user, e.g., cat owner, sets the feeder into the training mode, e.g. by using an input means such as a switch or button (e.g., touch-sensitive) on the feeder or by remote control. Thus may cause the feeder to change from a normal mode wherein the door preferably always fully uncovers the aperture when an animal arrives and fully covers the aperture when the animal leaves.

Control of the portion of the aperture to be covered in response to a detection that the animal has moved away may be automatic or manual. Where automatic, the feeder may control the door to cover a said larger portion depending on a count of how many times the animal has arrived and/or moved away from the feeder. Thus, a covered portion may be extended for example for every, or alternate, instance(s) of the animal feeding, or every 3, 4 or 5, etc. instances of the animal feeding.

There may further be provided the animal feeder, comprising at least one input means (e.g., switch, button, touch-sensitive sensor, etc.) to receive a user input, wherein the feeder is operable in said training mode wherein the feeder responds to each of a series of one or more, e.g., 1, 2, 3 or 4, etc., said user inputs by determining a next said portion to be covered in response to a said detection such that the next portion covers a portion of the aperture larger than (and preferably comprising) the preceding said portion.

Thus, each user input, e.g., the user pressing a button, may instruct a next training step with a larger door closure. The same or another user input means may be used to instruct the feeder to enter the training mode and/or to instruct the feeder to exit the training mode, for example to then enter a normal mode.

There may further be provided the animal feeder, wherein the door mechanism is operable to, in response to a last one of the one or more subsequent said detections, control the door to fully cover the aperture and form a preferably air-tight seal between the door and housing to thereby reduce (e.g., prevent) food odour detectable (for example by the user, e.g., pet owner; generally this means odour detectable by the animal/pet may similarly be reduced) from the feeder when the feeder contains food, e.g., when the feeder has a bowl with food in it.

According to a second aspect of the present invention, there is provided an animal feeder having a housing comprising an aperture for a food bowl and having a door for covering the aperture, the feeder comprising a door mechanism to control movement of the door over the aperture, wherein: the door has a foldable portion; and the door mechanism is configured to control the door such that the foldable portion folds to raise the foldable portion to a higher level above the aperture than an edge of the door, the edge of the door thereby moved such that the door uncovers at least a portion of the aperture.

Advantageously, a folding movement of such a door may reduce the risk of annoyance or injury to the animal, for example, the risk of the door hitting the animal or trapping a paw of the animal is reduced. Further advantageously, the door when folded to fully uncover the aperture may provide a protective barrier in front of a feeding animal, thus the feeding area may be more open when the animal is approaching the feeder and become more enclosed when the door is opened to allow the animal to feed.

Preferably the door edge is a front edge of the door configured to, when the door is closing, approach the intended feeding point, e.g., which point (for example having a mat) is accessible through an opening configured to restrict access to food in the feeder (e.g., the opening being of a loop antenna). The door is preferably configured so that the edge of the door is always in contact with and/or just above, e.g., less than 1 or 2 cm above, the housing during a movement of the door to fully close or open, such a movement comprising a folding or unfolding. In this regard it is noted that the door may have more than one foldable portion, e.g., more than two hinged parts.

There may further be provided the animal feeder, wherein the door comprises a plurality of parts and the foldable door portion comprises a hinge between adjacent said parts, the hinge such that, when the door mechanism controls the door to fully cover the aperture, the door parts form a flat door over the aperture.

Such an animal feeder may comprise a flexible seal at an interface between adjacent said door parts, the interface having a said hinge, the flexible seal to (preferably air-tight) seal the interface when the door mechanism controls the door to fully cover the aperture, preferably when the adjacent door parts lie flat in a common plane.

In an embodiment of the animal feeder, the door mechanism is configured to control the door such that a said foldable portion of the door flattens, the edge of the door thereby moved such that the door covers at least a portion of the aperture, wherein the feeder (preferably the door mechanism) comprises at least one arm (e.g., rail or push arm) to support the door during part (preferably an, e.g., initial, part before the door moves while resting on the housing) of said edge movement to cover at least the portion of the aperture, the arm to thereby prevent the edge of the door contacting the housing (e.g., food bowl, flexible seal and/or aperture perimeter) during the edge movement. Advantageously, such an embodiment may reduce the risk of door jamming on food piled up in, or dropped on an edge of, a bowl of the feeder. Preferably, at least one arm is configured to support the door such that the edge of the door remains at least about 1 cm, preferably at least about 2 cm, above the bowl aperture during the portion of said edge movement.

Such a feeder may be configured to such that an end portion of the door (e.g., at least one protrusion on the door, e.g., a tab, or cylinder and/or wheel, preferably protruding from the side of an, e.g., rectangular folding door, to rest on a side part of the housing and thus support the door from the side as the door moves to the fully closed position) moves in contact with the housing (e.g., on rail(s) of the housing) during a later part of a said edge movement, the end portion comprising said edge of the door, the door configured such that, when an obstruction (e.g., cat paw) to the later part of the edge movement is present, the door edge is liftable over the obstruction (thus the end portion of the door may completely lose contact with the housing). Advantageously, this may reduce the risk of a paw of the animal getting trapped between the housing and door.

Preferably the door rests on the housing merely due to gravity, or is biased onto the housing for example by spring(s), to provide the above contact during the later part.

There may further be provided the animal feeder, comprising a latch configured to pull the door onto the aperture at the end of a movement of the door edge to cover the aperture. Preferably the latch is configured to pull the door onto the aperture when the door edge is less than about 4 cm, preferably less than about 3 cm, 2 cm or 1 cm, from the front of the bowl. The latch may extend to a point that it starts to capture the door, the latch preferably gradually pulling the door down to during a final phase of the door movement to cover the bowl. In an embodiment the door mechanism may be strong enough to cause unlatch when pulling the door to uncover the aperture, alternatively the latch may be controlled electronically.

In an embodiment of such an animal feeder, wherein the housing has a flexible seal and the latch is configured to pull the door onto the seal to thereby reduce (e.g., prevent) food odour detectable (for example by the user, e.g., pet owner; generally this means odour detectable by the animal/pet may similarly be reduced) from the feeder when food is in the bowl aperture. Preferably the pulling onto the seal creates an air-tight interface between the door and seal, more preferably an air-tight space over the aperture (and/or bowl when present). Preferably the flexible seal is provided on the perimeter of the aperture and/or on the rim of a bowl having the aperture. Alternatively the seal may be provided on casework of the housing, to surround the aperture.

The door mechanism may be configured to separate a region of the door from the seal to thereby allow the door to move to uncover the aperture. Additionally or alternatively, the door mechanism may be configured to separate a region of a said door part from a said flexible seal at a said interface between the door part and an adjacent said door part, to thereby allow the door to move to uncover the aperture. Any such separation of a region may break the relevant seal at any point along the physical seal. In an embodiment this may end any suction due to any vacuum effect so that the door is free to move.

There may further be provided the animal feeder, wherein the door mechanism is located at an edge of the feeder, and preferably directly on the housing. Advantageously, such a feeder may be very compact.

According to a third aspect of the present invention, there is provided an animal feeder having a housing comprising an aperture for a food bowl and having a door for covering the aperture, the feeder comprising a door mechanism to control movement of the door over the aperture, wherein the feeder comprises: a loop antenna for reading an RFID tag of an animal; a processor for detecting authorisation of the animal based on the read RFID tag; and the door mechanism configured to control the door to at least partially uncover the aperture in response to a said authorisation detection, wherein the feeder further comprises: a frame having the loop antenna, the frame and loop antenna surrounding an opening and arranged to allow an animal to access the aperture through the opening; the door configured to, when the aperture is fully uncovered, present a barrier to access to the aperture by an animal, the barrier on an opposing side of the aperture from the frame; and side walls on opposing sides of the feeder, each said side wall disposed, when the aperture is fully uncovered, between the loop antenna and the barrier, the feeder thereby configured such that, when the aperture is fully uncovered, the frame and opening, the side walls and the door surround the aperture sufficiently to substantially hinder access to the aperture by a second animal when a first said animal is within the opening and blocking entry to the opening by the second animal.

Thus, an embodiment may be a selective feeder, e.g., selecting to provide access to food only for authorised cat(s).

Further advantageously, when the first said animal is within the opening and accessing food through the aperture, the second animal is preferably unable to feed at the same time as the first cat due to the blocked opening and frame, side walls and open door. (We further note that, similarly, for a non-selective feeder not having the antenna and/or frame, such side walls and open folded door may similarly substantially prevent access by a second animal).

Preferably the aperture is fully surrounded in a lateral plane parallel to the aperture plane, and optionally over the aperture. Thus a space over the aperture may be fully covered such that the feeder effectively has a roof over the aperture. Preferably each of the frame, side walls and/or the door is transparent or at least has a transparent window. Preferably, the surround prevents such access by the second animal standing by the feeder.

There may further be provided the animal feeder, wherein the side walls are transparent to allow an animal to see beyond the feeder when the animal is within the opening and accessing food through the aperture. Additionally or alternatively, the foldable door may be transparent, or at least have a transparent window, to allow the animal to see food through the aperture when the door is closed, for example when the door has formed an air-tight seal to reduce odour.

According to a fourth aspect of the present invention, there is provided an animal feeder having a housing comprising an aperture for a food bowl and having a door for covering the aperture, the feeder comprising a door mechanism to control movement of the door over the aperture, wherein the feeder comprises: a plurality of proximity sensors arranged to detect an animal on an approach towards the aperture; the door mechanism configured to control the door in response to a detection output of at least one said proximity sensor, wherein the proximity sensors comprise: at least one direct reflection sensor to receive light transmitted from the sensor and reflected back towards the sensor; and at least one crossed sensor having a transmitter and a receiver, the receiver positioned separately from the transmitter and arranged to receive light transmitted from the transmitter.

The inclusion of multiple sensors may allow the feeder to still operate correctly even when one or more sensors are blocked with stray food dropped by the owner or pet. Similarly, the control in response to a detection output of at least one said proximity sensor allows the feeder to operate reliably even if a sub-set of one or more of the proximity sensors is blocked for example by food dropped by the animal. Advantageously, use of both direct and crossed sensors may similarly improve reliability of operation. Preferably at least one of the sensors is an infra-red reflection sensor.

The door mechanism may be configured to control the door to (preferably fully) uncover the aperture in response to at least one said detection output indicating presence of an animal on an approach towards the aperture (e.g., at least on a straight line approach such as through a frame, and/or through a loop antenna of a selective feeder), said at least one detection output comprising at least a detection output of a said crossed sensor. Thus, a detection output from only one or more crossed sensors may be required to confirm that the animal is present and thus trigger opening of the door.

Additionally or alternatively, the door mechanism may be configured to control the door to preferably fully cover the aperture in response to a plurality of said detection outputs indicating absence of an animal on an approach towards the aperture, said outputs comprising a detection output of at least one said direct reflection sensor and a detection output of at least one said crossed sensor. Thus, all of the proximity sensors (e.g., 4 sensors if the feeder has 2 direct and 2 crossed sensors) may be used to confirm that the animal is absent and thus trigger closing of the door.

An embodiment of the animal feeder has authorisation circuitry comprising: an antenna (e.g., a loop antenna as mentioned above) for reading an RFID tag of an animal; and a processor (e.g., a processor as mentioned above, as for any processor mentioned herein, the processor may be positioned anywhere in the feeder, e.g., inside the housing casework and/or the processor may comprise any processing unit(s) such as microprocessor, CPU, ASIC, FPGA, etc.) for detecting authorisation of the animal based on the read RFID tag, wherein the door mechanism is configured to perform said response to a said detection by the at least one said proximity sensor when the processor indicates a said authorisation.

The feeder may be configured to activate the authorisation circuitry in response to a sense output of at least a said crossed sensor.

There may further be provided the animal feeder, operable in a first mode and a second, higher power mode, wherein: operation of at least one of the door mechanism and authorisation circuitry is inhibited in the first mode and enabled in the second mode, and the feeder is configured to change operating mode from the first mode to the second, high power mode in response to a said detection by a said proximity sensor (preferably a crossed sensor). Preferably the bowl is kept fully covered by the door during the first, low power mode.

An embodiment of the feeder may have authorisation circuitry comprising: an antenna (e.g., an above-mentioned loop antenna) for reading an RFID tag of an animal; and a processor (e.g., an above-mentioned processor) for detecting authorisation of the animal based on the read RFID tag, wherein: the feeder is configured to be operable in a learn mode wherein the authorisation circuitry is configured to, when each of one or more animals having a said RFID tag approaches the feeder (or, more specifically, the aperture), read and store an identification code of the RFID tag of the animal, the authorisation circuitry to thereby store at least one identification code, and the feeder is configured to be operable in an authorisation mode wherein: the authorisation circuitry is configured to read an identification code of a said RFID tag of an animal when the animal approaches; the processor is configured to detect authorisation of the animal by comparing the read identification code to the at least one identification code stored during the learn mode; and the door mechanism is configured to move the door to at least partially uncover the aperture in response to a said authorisation detection. Preferably the door mechanism is configured to operate the door such that the aperture is at least partially uncovered during the learn mode.

According to a fourth aspect of the present invention, there is provided an animal feeder having a housing comprising an aperture for a food bowl and having a door for covering the aperture, the feeder comprising a door mechanism to control movement of the door over the aperture, wherein the feeder comprises: a load cell for weighing an amount of food placed in the feeder; and an interface for providing to a user data based on a result of said weighing.

Advantageously, such a result may be an amount of food provided for the animal by loading the feeder, and/or an amount of food removed from the feeder by an animal. The data may be provided to the user by means of a display on the feeder, for example on the top of the frame having a loop antenna of a selective feeder.

In an embodiment, the interface is a communications interface for sending the data to a remote site such as a desktop or laptop computer, mobile phone, tablet, etc. Thus, the feeder may be monitored remotely to assess the feeding habits, diet and/or health of the animal.

Such a communications interface may be a transmitter or transceiver and may be a wireless or wired interface, and the remote site may be a desktop computer, laptop, tablet or mobile phone for example, preferably for communication with the feeder over the internet. The use of a transceiver may allow remote control of the feeder from such a remote site. For example, opening and/or closing of the door, a mode of the feeder (e.g., entry to the training mode and/or increase in door coverage as the pet becomes more comfortable during the training mode, and/or entry to a learning mode and/or normal mode), loading of food through the aperture, etc. may be remotely controllable.

Thus, the feeder may be operable by remote control and/or for networking such that its control and/or reception of status updates can be undertaken remotely, e.g., over the internet. A selective pet feeder that can be viewed over the internet or via remote control would preferably include a load cell into the feeder to monitor the amount of food delivered and consumed by the pet. It may be desirable that this information be collated over the internet to provide the owner information on the feeding of their pet either for weight control or some other medical requirement. Such a feeder may incorporate status updates on feeding, including weight of food consumed.

The food placed in the feeder may be placed in a food bowl having the aperture, in a food bowl inserted into the feeder through the aperture, and/or in a package placed in the feeder (or a food bowl thereof) through the aperture.

There is further provided an animal feeding monitor for receiving data from such an animal feeder, wherein the monitor is configured to display on the basis of the data at least one of an amount of food provided to an animal by the feeder and an amount of food removed from the feeder by an animal. Preferably, the monitor is at a remote site, for example, on a desktop or laptop computer, mobile phone, tablet, etc.

According to a further aspect of the present invention, there is provided an animal feeder having authorisation circuitry comprising: an antenna for reading an RFID tag of an animal; and a processor for detecting authorisation of the animal based on the read RFID tag, wherein the feeder has a plurality of food compartments and a plurality of doors, each said door for covering a respective said food compartment, the feeder configured to move a door to uncover a food compartment corresponding to the read RFID tag.

As described above, the antenna may be a loop antenna preferably within a frame. The processor may be a processor as described above. Each door is preferably for fully covering the respective compartment.

According to a further aspect of the present invention, there is provided a food bowl for fitting into an animal feeder, the food bowl comprising a flexible seal, the seal for providing a substantially air-tight seal when the seal is placed against a foldable door. The food bowl may be fitted into the aperture of a feeder of any aspect described herein. In this case the aperture and rim of the food bowl may be substantially (e.g., exactly) coincident. The flexible seal may reduce food odour detectable (preferably by the user, e.g., pet owner; generally this means odour detectable by the animal/pet may similarly be reduced) from the feeder when food is in the bowl in the feeder.

Preferably, the bowl is removable from a said animal feeder, for example for disposal or cleaning, and/or is sealed and contains food. The feeder is preferably a feeder as described by any one of the above aspects of the invention as described herein. Advantageously, the bowl may be disposable and/or sold separately from the feeder comprising the housing and aperture. A removable bowl may be particularly advantageous for an air tight sealed feeder which may be less tolerant to messy eating by a pet where food is dropped onto the seal, e.g., a seal between housing an door for example on a rim of a food bowl. A desirable feeder may allow easy cleaning of such a seal.

The bowl is preferably configured to fit into any feeder as described above, for example the bowl may have one or more protrusions (indents) to fit into corresponding indent(s) (protrusion(s)) on the feeder housing, to allow the bowl to be placed in a position such that the door can seal it. Additionally or alternatively, the bowl may have a communication means to send data to any feeder as described above. For example, the data may be an identification code, e.g., to identify a bowl type, manufacturer and/or a type of food in the bowl and be sent from the bowl to a feeder, for example the feeder having a communications interface as described above (the feeder in this case optionally comprising the load cell). Thus, the feeder may be able to determine whether and/or how to operate in response to the code (e.g., operation of the door mechanism may be enabled or disabled dependent on receiving an authorised code), and/or provide to a remote site information relating to amount(s) of food delivered and/or consumed and, additionally, the type(s) of the food delivered and/or consumed. Such data when displayed for example at the remote site may be advantageous to the user to identify foods that the animal prefers and/or to allow the user to analyse the animal's diet and/or health in great detail.

According to a further aspect of the present invention, there is provided a food package containing animal food, the package for fitting into any feeder described above. The feeder may comprise a food bowl preferably having the aperture so that the package is put into the food bowl.

Similarly as for the above food bowl, the package is preferably shaped to fit into any feeder as described above, for example the package may have one or more protrusions (indents) to fit into corresponding indent(s) (protrusion(s)) on the feeder housing, to allow the package to be placed in a position such that the door can seal the package and/or a bowl containing the package in the feeder. Additionally or alternatively, the package may have a communication means to send data to any feeder as described above. For example, the data may identify a type of food in the package and be sent from the package to the feeder having a communications interface as described above (the feeder in this case optionally comprising the load cell). Thus, the feeder may be able to provide to a remote site information relating to amount(s) of food delivered and/or consumed and, additionally, the type(s) of the food delivered and/or consumed. Such data when displayed for example at the remote site may be advantageous to the user to identify foods that the animal prefers and/or to allow the user to analyse the animal's diet and/or health in great detail.

An embodiment of an animal feeder may comprise all of the features of any one or more of the above aspects providing an animal feeder. Any such animal feeder may comprise any one or more of the above optional features of any one or more of the aspects described above. Thus, and merely by way of example, the above description relating to the aperture for the first aspect apply similarly for any other aspect defined as having an aperture, any the above description of an animal in relation to the first aspect similarly applies to any other aspect.

According to a further aspect of the present invention, there is provided a cat feeder comprising: a housing comprising a food bowl; a foldable door to cover the food bowl; a seal to provide a substantially air-tight interface between the door and the food bowl to thereby reduce food odour detectable outside the feeder when the food bowl contains food; a latch to latch the door onto the seal: and a sensor to detect presence of a cat; a door mechanism to control movement of the door over the food bowl in response to an output of the sensor, the door mechanism at an edge of the feeder and comprising a push arm; and an input for a user to set a training mode of the feeder. Advantageously, odour detectable by a user, and preferably also by the animal/pet, is reduced, more preferably prevented. Preferably the interface is completely, i.e., 100%, air-tight.

There may be provided a feeder of any above aspect comprising at least two pairs of an infrared emitter and a corresponding infrared receiver, the pairs spatially separated to enable detection of approach of different size animals toward the aperture.

Such a feeder may be configured to read an RFID tag of an animal when a drop in a signal strength between a said infrared emitter and corresponding infrared receiver is registered, and to open said door when said reading of said RFID tag indicates an authorised said animal.

There may be provided a feeder of any above aspect, comprising a tag reader to detect presence of an authorised animal at the feeder, wherein: the tag reader is configured to, when presence of an authorised animal at the aperture has been detected by the tag reader, repeatedly scan to read an RFID tag of an animal to monitor whether the authorised animal remains at the feeder; and the feeder is configured to maintain the door open while the repeated scanning indicates that the authorised animal remains at the feeder and to close the door if said repeated scan indicates a non-authorised animal. The non-authorised animal may be detected when an ID number is picked up but it has changed from an authorized number to a non-authorized number; in this case the door may close. In a specific embodiment, the repeated scan to read an RFID tag of an animal may monitor whether the authorised animal remains at the aperture for a food bowl of the feeder, and/or the maintaining the door open may be while the repeated scanning indicates that the authorised animal remains at the aperture. The repeated scans may detect that a pet is still in the vicinity of the feeder (within the read range of the reader) but not necessarily with their head close to specifically, e.g., the aperture for the food bowl or an entrance area of the feeder such as defined by a hoop antenna (if present). In an embodiment, the door may be maintained open if the authorised animal is rescanned and may be closed if an ID number is read that is not unauthorised. In this regard, it is noted that reading an ID number that is not unauthorised is generally different to reading no ID number. (Reading an ID number with a valid CRC error check but wherein the ID number is not in the memory as an authorised animal may in embodiments be treated as reading an ID number that is not unauthorised).

Such a feeder may be configured to, when no ID number is read by a said repeated scan, determine a strength of RFID signal received in response to said repeated scan; and close the door when the determined signal strength exceeds a threshold level.

Additionally or alternatively, such a feeder may be configured to, when no ID number is read by a said repeated scan, determine a strength of RFID signal received in response to said repeated scan; and close the door when the determined signal strength is below a threshold level.

There may be provided a feeder of any above aspect, comprising a proximity sensor to detect that an animal is proximate to the feeder and a tag reader to scan an RFID tag of an animal to detect an authorised animal at the feeder, wherein: the feeder is configured to determine when an authorised animal detected by the RFID tag reader has moved away from the feeder; the proximity sensor is configured to monitor for proximity of an animal to the feeder for a predetermined time period after a said determination that the authorised animal has moved away from the feeder; the tag reader is configured to scan an RFID tag of an animal when the monitoring indicates proximity of an animal to the feeder during said predetermined time period; and the feeder is configured to maintain the door open if said scan indicates an authorised animal and to close the door if said scan indicates a non-authorised animal. The non-authorised animal may be detected when an ID number is picked up but it has changed from an authorized number to a non-authorized number; in this case the door may close. In an embodiment, the door may be maintained open if the authorised animal is rescanned and may be closed if an ID number is read that is not unauthorised. In this regard, it is noted that reading an ID number that is not unauthorised is generally different to reading no ID number. (Reading an ID number with a valid CRC error check but wherein the ID number is not in the memory as an authorised animal may in embodiments be treated as reading an ID number that is not unauthorised).

Such a feeder may be configured to maintain the door open if a strength of an RFID signal received in response to said scan is below a threshold level.

Alternatively, such a feeder may be configured to close the door if a strength of an RFID signal received in response to said scan is below a threshold level.

The feeder may comprise an adjustable timer to set the predetermined time period.

There may be provided a feeder of any above aspect, comprising a shroud to prevent access to the aperture from a rear of the feeder.

There may be provided a feeder of any above aspect, comprising a side restriction on each side of the feeder to limit a width of a front access by an animal to the aperture.

Such a side restriction maybe removable from the feeder.

According to a further aspect of the present invention, there is provided a method of training an animal to use a feeder, the feeder comprising a food bowl and a door for covering and uncovering the food bowl, the method comprising: i. at least once: uncovering the food bowl, allowing the animal to feed from the bowl and then covering a first portion of the food bowl; ii. then at least once: uncovering the food bowl, allowing the animal to feed from the bowl and then covering a second, larger portion of the food bowl; then iii. uncovering the food bowl, allowing the animal to feed from the bowl and then fully covering the food bowl. However, it is noted that the method may further comprise intermediate steps, for example one or more steps between ii and iii similar to step ii but uncovering a yet larger portion than the preceding step. The method may be triggered automatically, for example at start-up of the feeder, or manually by a user input, for example the user pressing a button. The progression from each step to a following step may effectively be controlled by the feeder automatically increasing the portion to be covered, or manually by a user input, for example using a button on the feeder, to instruct increasing the portion to be covered.

Preferred embodiments are defined in the appended dependent claims.

BRIEF DESCRIPTION OF THE DRAWINGS

For a better understanding of the invention and to show how the same may be carried into effect, reference will now be made, by way of example, to the accompanying drawings, in which:

FIGS. 10A and B shows a pet feeder including proximity detectors, wherein FIG. 10A shows a view from the front of the feeder and FIG. 10B shows a view from the top;

DETAILED DESCRIPTION OF PREFERRED EMBODIMENTS

Embodiments generally relate to pet feeders. For example, pet feeder embodiments may selectively open for certain pets, and/or may have an air-tight seal on the enclosed food when not in operation.

Thus, we describe below pet feeders that may open for a pet or selectively open for certain pets within a household.

The feeders may have an air-tight seal on the enclosed food when not in operation, keeping the food fresher for longer and minimising difficulties with flies or odours. Additionally or alternatively, the feeder may incorporate a training mode for the pets to learn how to adjust to its use, and may also have a design that restricts access by other animals trying to steal their food.

Figure 1:
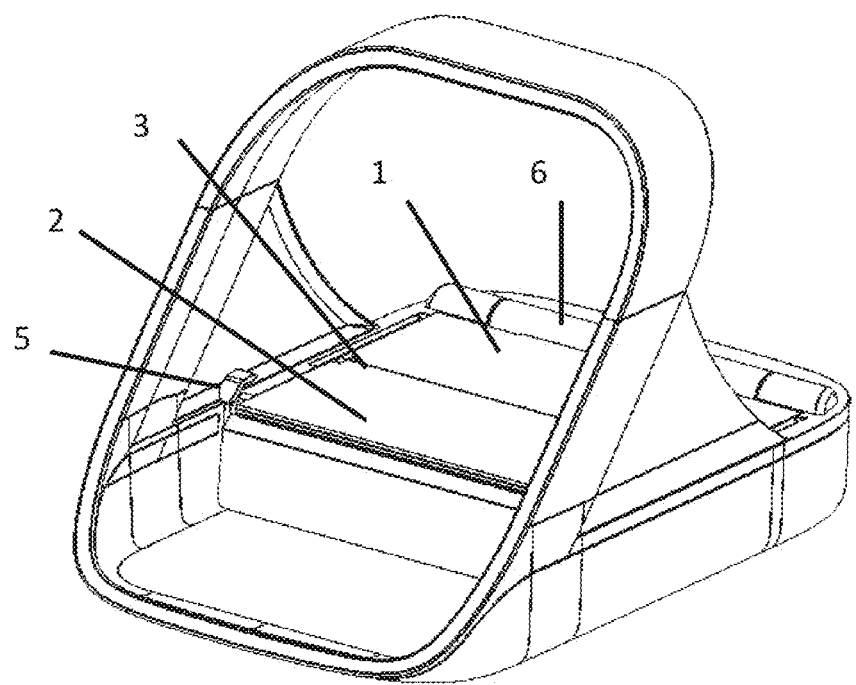
FIG. 1 shows a pet feeder with the door closed.

FIG. 1 shows an image of a feeder. The feeder comprises in this example a 2 part door made up from a rear part 1 and a front part 2; in other embodiment there may be more parts so that the door is foldable in a concertina-like fashion. These parts are joined by a hinge 3 to form a foldable portion, the hinge disposed at an interface between the door parts of the portion. The door is shown in the closed position where the two parts of the door lie in the same plane. The door is held in place by a driven hinge 6 at the rear 4 and a latch at the front 5.

Figure 2:
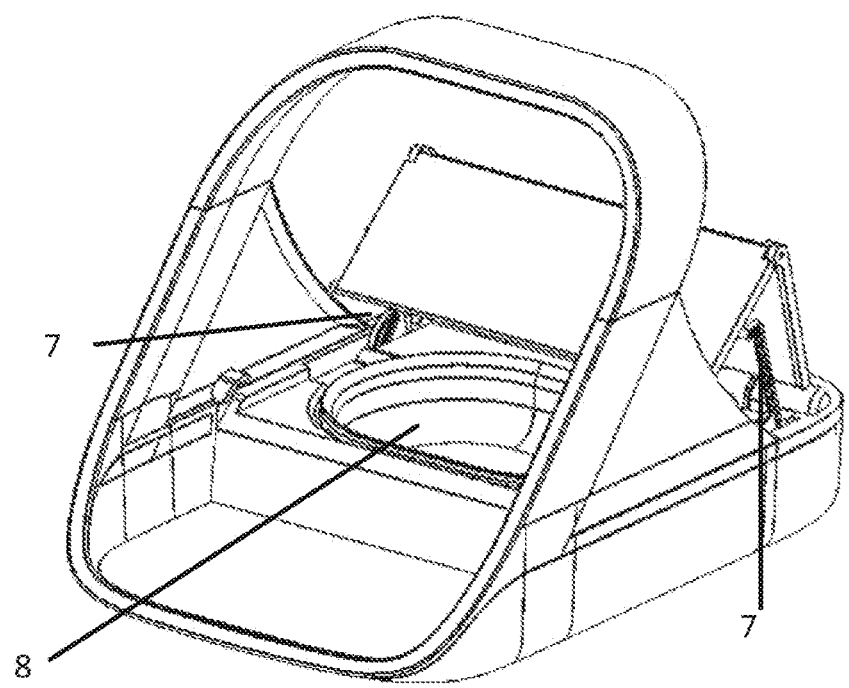
FIG. 2 shows a pet feeder with the door partially open.

FIG. 2 shows an image of the feeder when the door has been partially opened. The opening is achieved through the rotation of the driven hinge 6 from horizontal towards vertical. As the driven hinge rotates the front of the door moves backwards, folding up. Push arms 7 are also shown onto which the door rests as it opens up. These are preferably used to achieve the desired action of the end of the door as it opens and closes.

Figure 3:
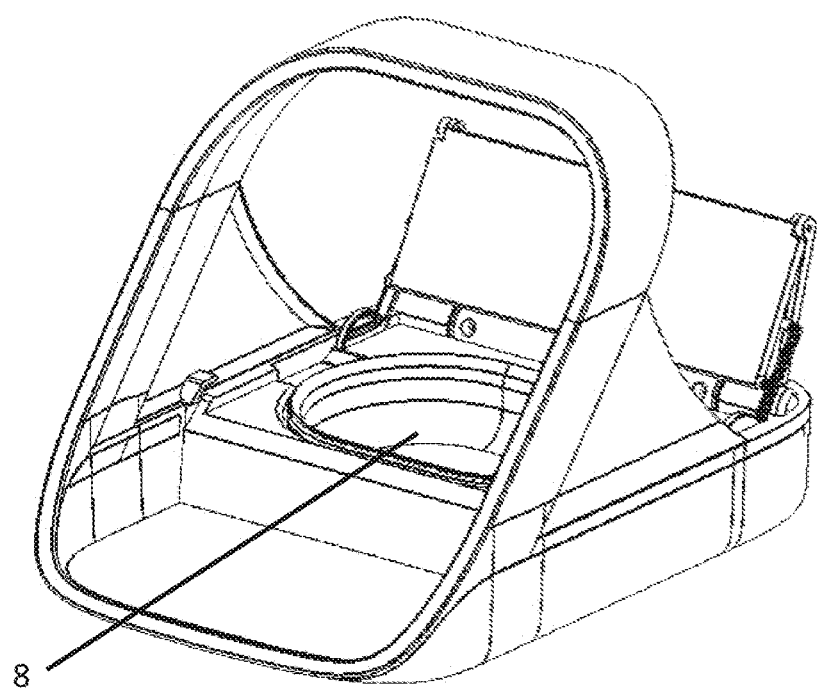
FIG. 3 shows a pet feeder with the door open.

FIG. 3 shows an image of the feeder when the door is fully open and folded up towards the rear of the unit. Such a folding design gives a very compact design of feeder, which provides a benefit when fitting into a normal domestic environment.

Figure 4:
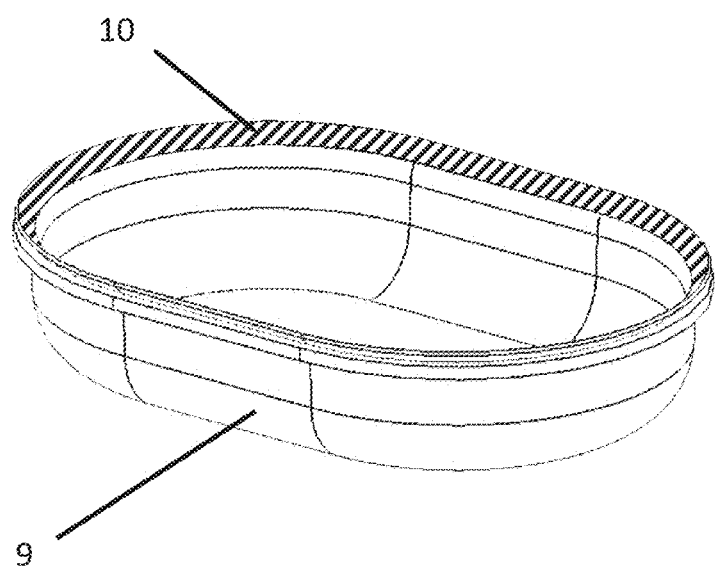
FIG. 4 shows a food bowl with a flexible seal.

In FIGS. 2 and 3 where the door is not closed the food bowl 8 (within an aperture of the housing, or integral to the feeder such that the rim of the bowl provides an aperture for access to food in the bowl) is clear. (It is further noted that the item 8 as shown in FIGS. 2 and 3 may however be a food package (preferably disposable) optionally comprising a bowl, or food bowl 8 may be adapted to receive a food package having a shape such that the door can close over the bowl and seal the package and/or bowl). Such a food bowl not integral to the housing may be easily removable from the unit for addition of food and/or cleaning. FIG. 4 shows the food bowl separately, comprising a solid bowl 9 and a flexible seal 10. When the door is closed onto the bowl it is in contact with the flexible seal and the food therefore lies in an air tight compartment and will remain fresher for longer as a result.

Figure 5A:
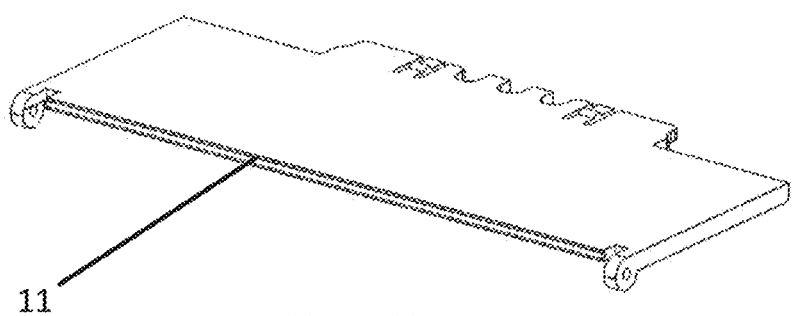
FIG. 5A shows the rear part of a 2 part door.
Figure 5B:
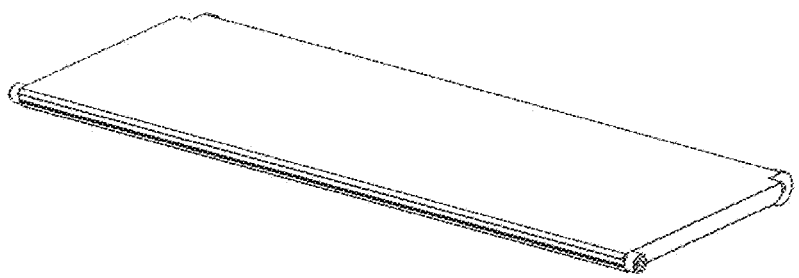
FIG. 5B shows the front part of a 2 part door.

The two parts of the door are shown in FIG. 5. The rear part of the door is shown in FIG. 5A and the front in FIG. 5B. A flexible seal 11 is attached to the rear part of the door. When the door is closed this seal is in contact with the front part of the door and the two parts of the door together form an air-tight assembly. When in contact with the flexible seal on the bowl in the closed position, this provides an air tight compartment for the bowl.

While a single seal is shown on the back part of the door, alternative arrangements that would work equally well include putting the seal on the front part of the door or both parts of the door.

It is noted that while FIG. 5 shows a hinged 2 part door with a separate flexible seal, an alternative would be a single part that folds at a 'live hinge'. Such a door would operate in the same way as the door shown in FIG. 5 but would have the advantage that it could be moulded as a single part, reducing cost. It would also not require a separate flexible seal as the 2 parts of the door would be sealed by the live hinge.

One difficulty with an air tight compartment for the bowl is the possibility of the bowl sticking to the door through suction. If a solid door were used and moved vertically to open the door this could result in the bowl remaining in contact with the door and raising up out of its normal position. The 2 part door construction breaks the air tight seal with the bowl as its shape changes. The seal to the bowl and the seal between the two parts of the door breaks with the initial movement of the door. As such any chance that the bowl will stick to the door through suction is much reduced, potentially zero.

Although a 2 part door construction is shown, it is clear that 3 or more parts would also be possible and give the same benefit of a compact design when open and a seal on the bowl when closed that is easily broken when the door opens.

Figure 6A:
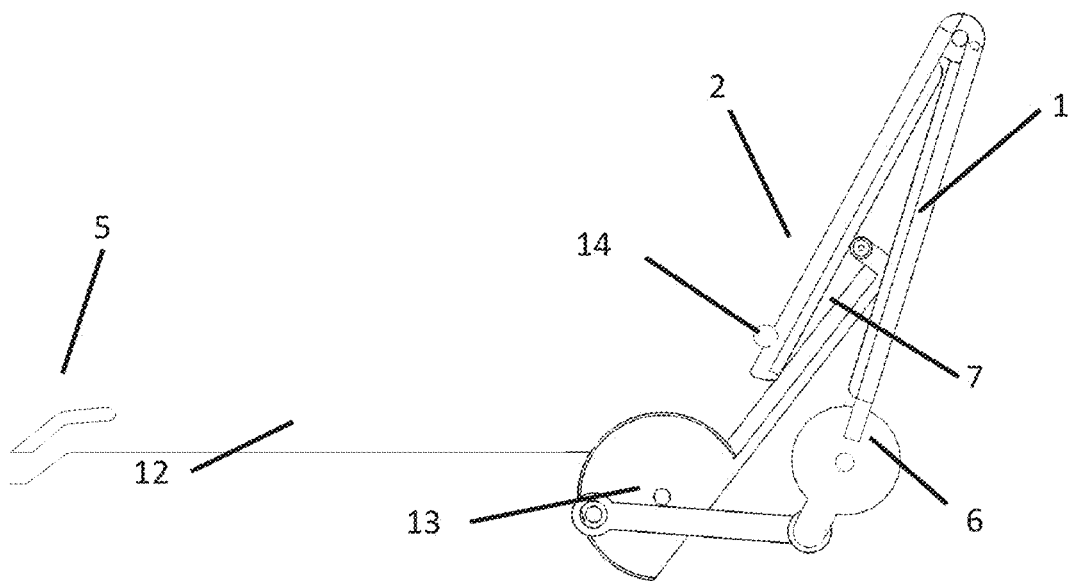
FIG. 6A shows a cross section of a door and the upper surface of the feeder casework.

FIG. 6 shows a cross section view of the 2 part door 1, 2 in the open position, folded up to the rear of the feeder. As shown, a door mechanism comprises a push arm 7, driven hinge 6 and linkage 13. The push arm 7 is shown together with a linkage 13 that links the motion of the push arm to the driven hinge 6. As the driven hinge is rotated anti-clockwise to the horizontal position the rear portion of the door rotates by the same amount. The linkage to the push arm causes rotation of the push arm which in turn pushes the front portion of the door out over the top of the bowl. The resulting clearance between the leading edge of the door and the bowl or casework has the benefit to minimise the chance of the door jamming on any food dropped around the bowl.

Figure 6B:
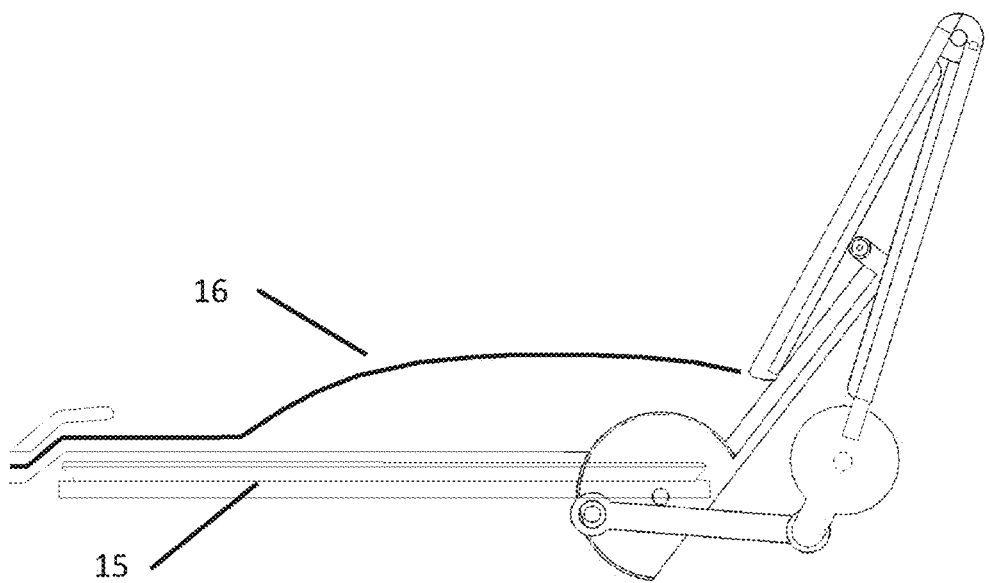
FIG. 6B shows the typical motion of the door and the top seal of a food bowl.

As the driven hinge rotates further the front part of the door eventually makes contact with the top surface of the housing, e.g., feeder casework 12, and glides further forward. Once in contact with the feeder casework the push arm breaks contact with the front part of the door. Finally when the driven hinge rotates fully a pin 14 on the end of the door is captured by the latch 5. This pulls the end of the door down vertically and the whole door compresses down onto the flexible seal 15 of the bowl. FIG. 6B shows the same cross section with the typical motion of the end of the door indicated 16 and the position of the bowl seal 15.

When the door closes the leading edge is not constrained for most of the motion, either resting on the push arm in one part of the door movement or the top surface of the casework during a later part of the door movement. Such a setup may be beneficial in the event of an obstruction, e.g., if a pet leaves its paw in the way of the door e.g. in the bowl. Rather than the door pinching tight onto the paw it may instead lift, e.g., ride up, over the top of the paw, which may then be easily retracted. The door is not pulled tight shut by the latch until it has covered most of the bowl and there is no longer sufficient space between the door and the front of the bowl to fit a paw. There is therefore no chance of pulling the door tight down onto a paw that could lead to injury.

Figure 7A:
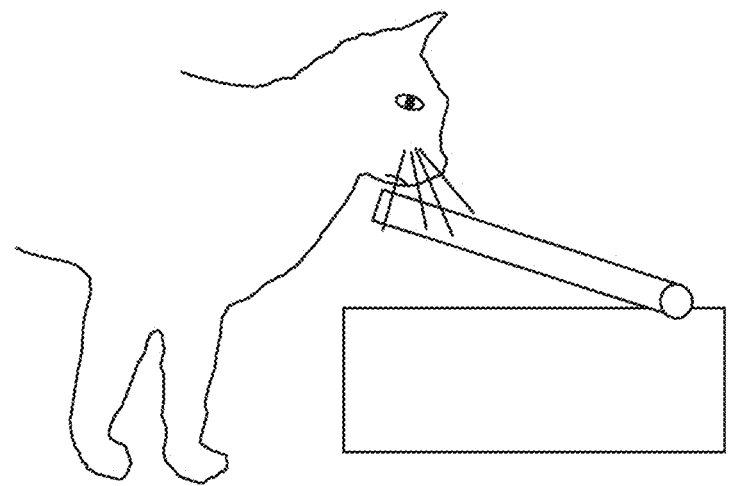
FIG. 7A shows a pet feeding from a feeder with a solid door and a rear hinge.
Figure 7B:
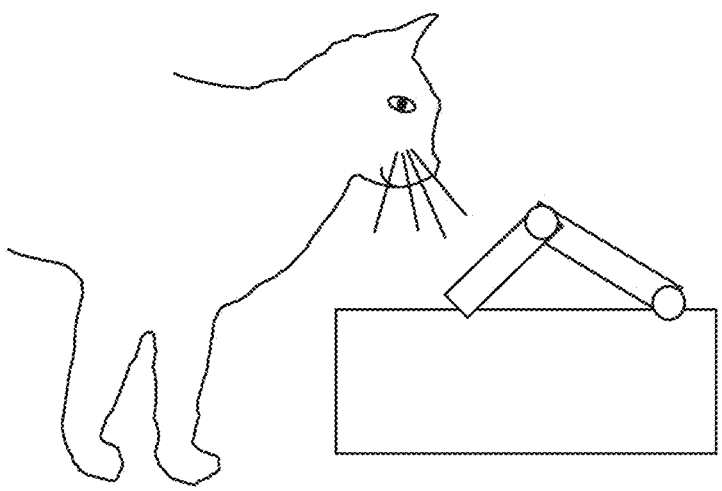
FIG. 7B shows a pet feeding from a feeder with a 2 part door and a rear hinge.

When a pet approaches the feeder to feed, there will be a time required to register the presence of the pet and activate the opening of the door if required. FIG. 7A shows a possible result of this for a feeder with a solid door that is hinged at the back. It is clear that the motion of the front part of the door is not good as it can potentially hit the pet on the bottom of their chin when they approach to eat from the bowl. This may make the pet hesitant to feed. FIG. 7B shows the result with a 2 part door construction as described above. It is clear that the motion of the door is now away from the pet and will no longer hit the pet's chin on their approach. This may make the pet happier to use the feeder.

Figure 8:
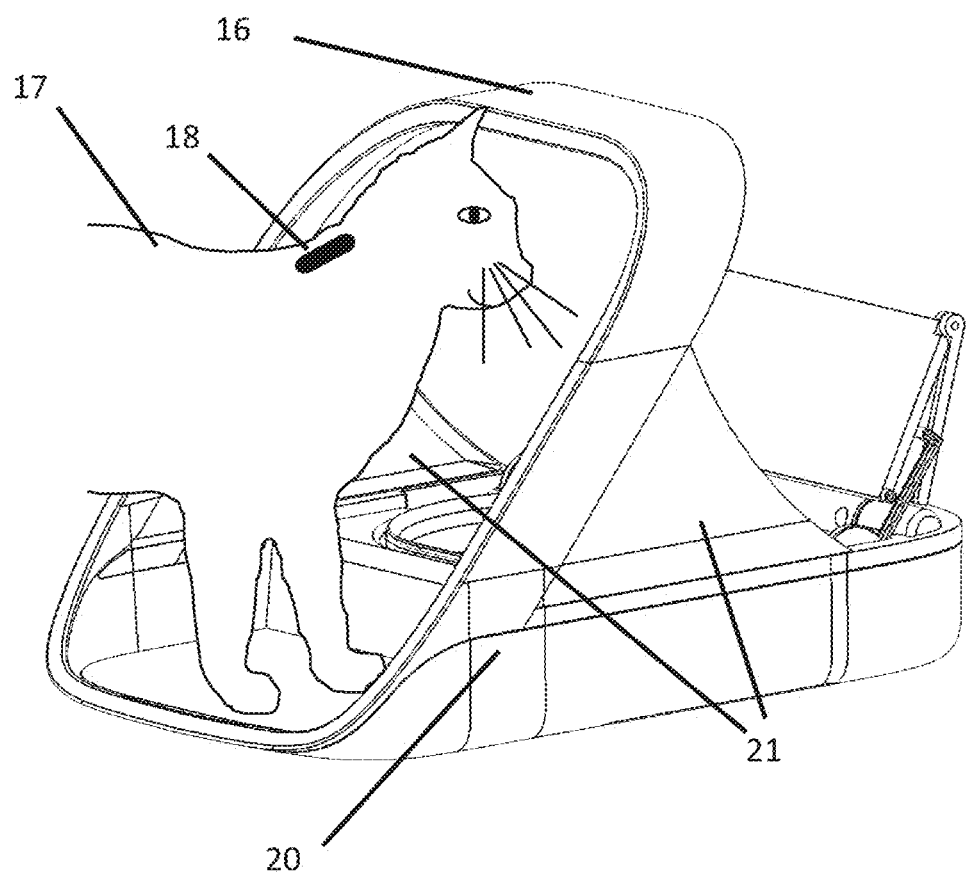
FIG. 8 shows a pet feeding from a selective feeder.

FIG. 8 shows an example of a selective pet feeder 20. The pet feeder includes a frame having a loop antenna 16 that is used to read the pet's sub-dermal microchip 18 or collar tag, either of which may comprise an RFID tag. As shown, the pet has already approached the feeder and been authorised to feed, the door opening as a result. The location of the antenna is set forward from the bowl so that it is closer to the microchip or collar tag of the feeding pet. This may make the RFID read easier to do and more reliable as a result. Furthermore it may be able to read the pet when at a greater distance from the food bowl, allowing the door to be open when the pet reaches it.

The initial setup of the feeder for authorised pets may use a learn mode. An input means such as a button may be pressed to set the feeder into learn mode and the door opened. When a pet approaches the ID code of its microchip or collar tag may be read and this number stored in memory corresponding to an authorized pet. Multiple pets may be learnt if more than one pet is required use the same feeder.

Figure 9:
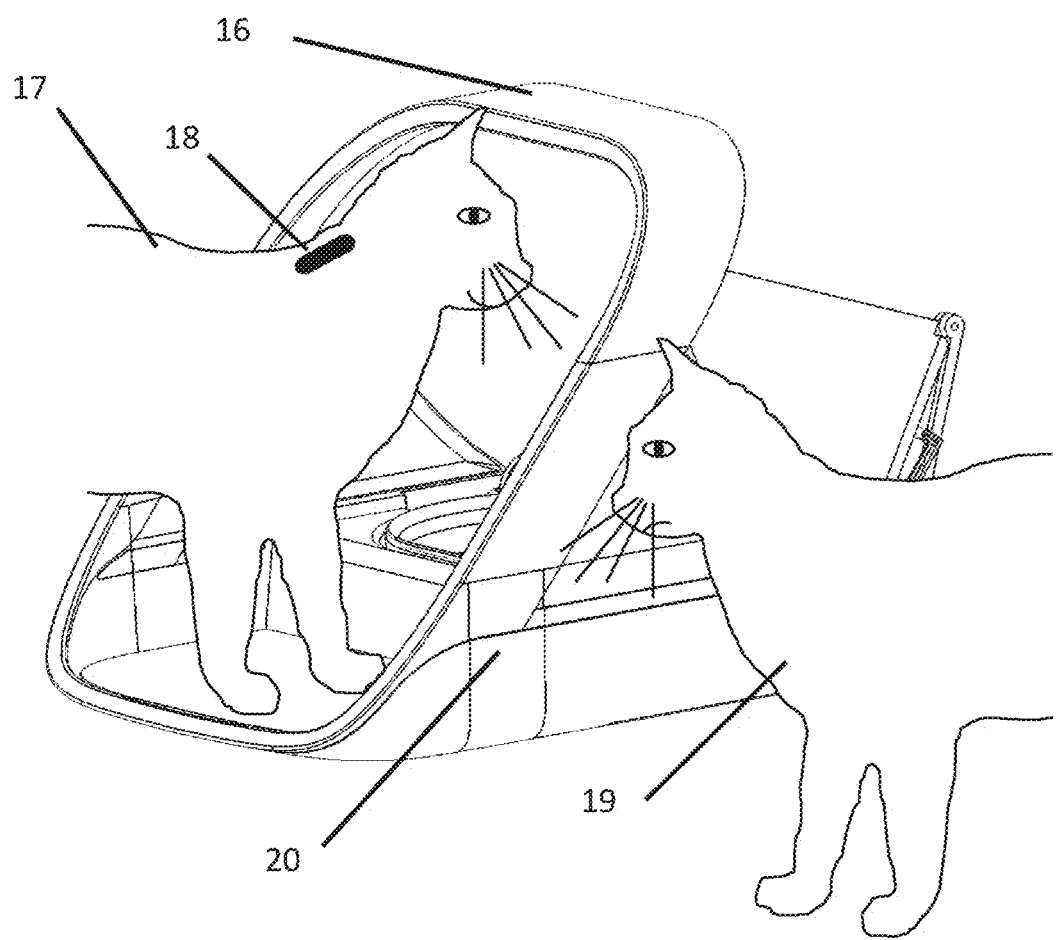
FIG. 9 shows a pet feeding from a selective feeder and an unauthorized pet unable to feed.

The sides of the loop antenna form a barrier to side entry of an unauthorized pet that tries to feed when the door is open for the authorised pet. In addition FIG. 8 shows the presence of side guards (side walls) 21 that prevent access to the bowl from the side, behind the antenna. The side guards may be transparent. The open door provides a barrier to the rear when in the open position, whilst leaving the whole unit with an attractive open design when closed. The use of a transparent door and transparent side guards will enable the pet to view around them any other animals approaching and is a significant improvement on a fully enclosed design which would limit external viewing and may make the pet feel vulnerable. FIG. 9 shows an image of an unauthorized animal 19 attempting to gain access to the food bowl but being blocked by the structure of the feeder.

Figure 10A:
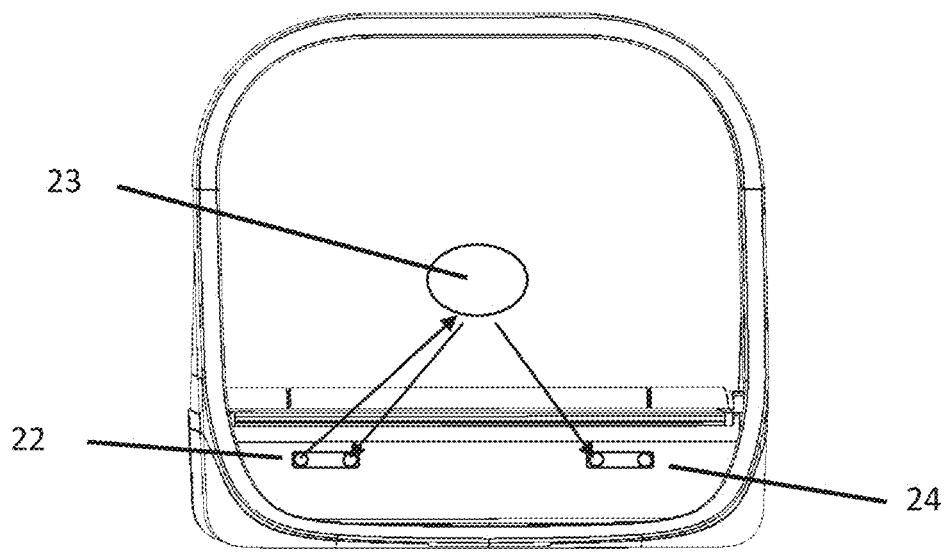
Figure 10B:
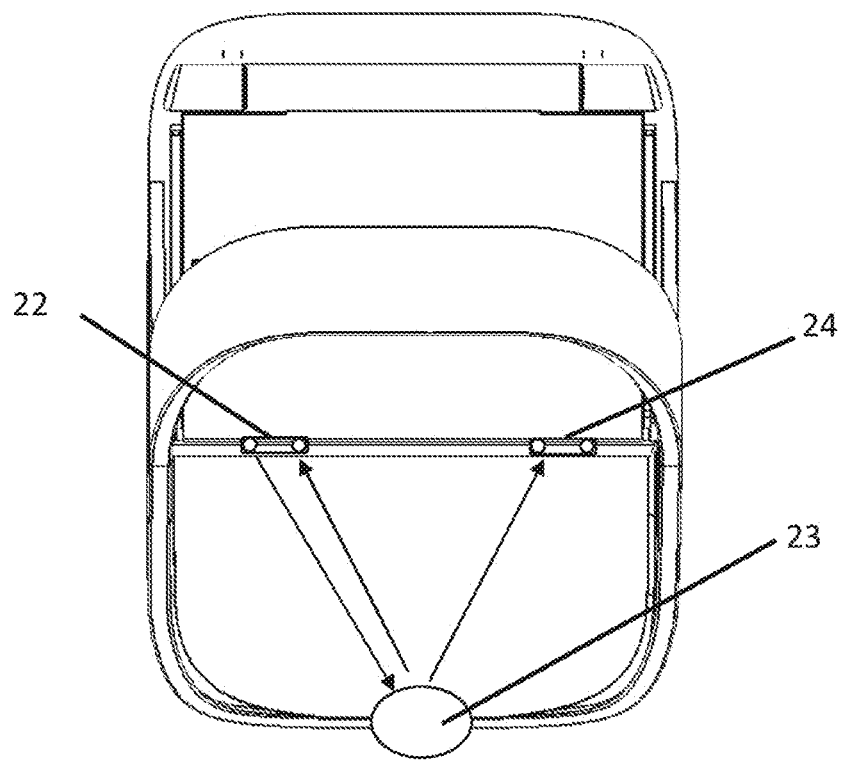

FIG. 10 shows an image of a feeder including proximity detectors to register the approach of a pet. FIG. 10A shows a view from the front of the feeder and FIG. 10B shows a view from the top. Two sensors in the form of proximity detectors 22 24 are shown on the left and right hand side of the feeder. Each proximity detector is an optical detector comprising an infrared LED and infrared photodiode. These optical parts are angled towards the centre of the loop antenna. Light is emitted from the first detector 22 and may be reflected back from a solid object 23 to the photodiode in the same detector. Alternatively it may be reflected to the photodiode in the second detector 24. These optical paths are shown in FIG. 10. In addition the second detector 24 may emit the light and be detected by the photodiode in either detector. As such there are 4 possible light paths reflecting from the solid object 23. When a pet approaches the feeder it will reflect infrared light that if picked up in one or more of the four optical paths may indicate the presence of the pet. Once the presence of the pet is registered the feeder may read the microchip or collar tag number for the pet. If the resulting ID code corresponds to an authorized pet then the door may open. Alternatively if the feeder is non-selective this step may be omitted and the door opened once the presence of the pet is registered. The door may stay open until the proximity detector indicates the pet has left the area. The reader may optionally attempt to read the pet's ID code again to confirm the pet has left the area. At this point the door may close. There may optionally be a time required for the pet to be gone by before the door is closed in order to cope with the possibility of a pet backing off from the feeder to eat some food before coming back for more. In this situation it may be beneficial to leave the door open for the pet.

The use of multiple sensors provides more information than a single sensor. As such this system may be tolerant to one or more sensors becoming blocked with food. The algorithm to detect the pet's presence may only require some of the sensors to be triggered. Similarly, the algorithm to detect the pet has gone away may not require all sensors to indicate no pet, in case a reflection from some dropped food or other body is indicating a pet's presence on one or more sensor. Alternatively the feeder may register whether the behaviour of the sensors indicates that one of them may be blocked and remove that channel from the decision of whether a pet is present or not. A warning light that indicates the sensors should be cleaned may optionally be lit.

The combination of direct and crossed sensor paths may provide more accurate determination of pet position. As the pet moves in the crossed sensor path will indicate the presence of a pet, however when they move in close to the bowl the crossed sensor path will become blocked. The direct reflection path however will continue to increase in signal strength as the pet moves closer. As a result the location of the pet within the feeder may be determined. Such information may be used to adjust the behaviour of the microchip reader and door control in the feeder. For example the feeder may activate the reader only when the crossed sensor path indicates the presence of the pet close in to the bowl. However, when concluding that the pet has departed it may require all sensor paths to indicate no pet, as this requires the pet to be further from the feeder. This approach is more tolerant to not activating when a pet just walks in the vicinity of the feeder, rather than wanting to feed.

The feeder may optionally be in a low power mode when waiting for a pet to approach and running its proximity detectors. Transferring to a high power mode and activating the reader and/or the door when a pet is present will save power compared to continual running in a high power mode. However, if the pet feeder is a selective feeder it is appreciated that continual running of the RFID reader is also possible, in which case proximity sensors may not be required. If no pet selectivity is required then there will be no antenna and only a proximity detector is required.

Figure 11:
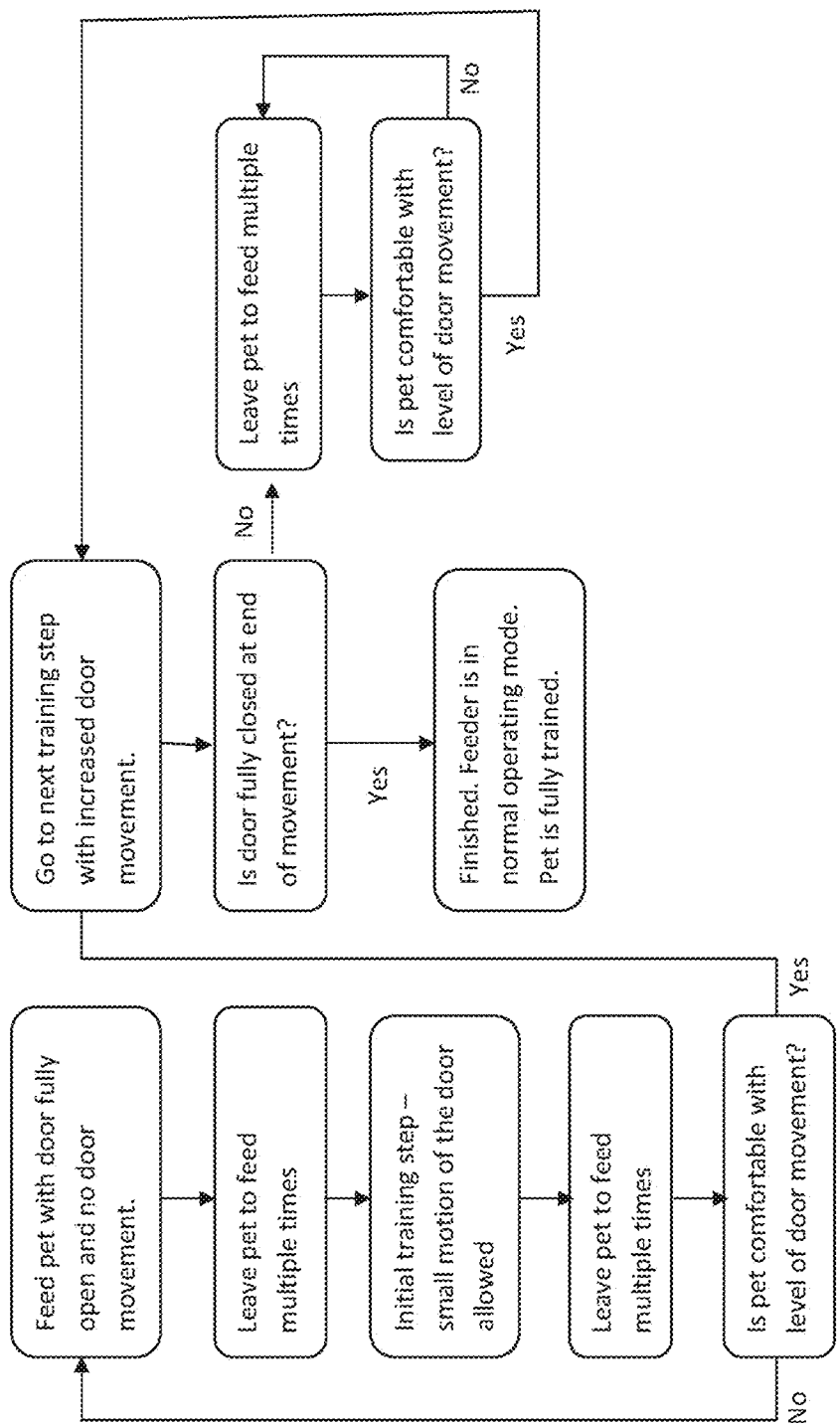
FIG. 11 shows a training process to enable a pet to become accustomed to using a pet feeder.

When a pet first uses the pet feeder, it may require a period of training to become accustomed to it. Initially the pet may not understand that food is available in the feeder, particularly if the bowl has a seal to the door and no food odour is present. Additionally they may be initially startled by the movement of the door. As such a training mode may be implemented in the feeder. The training mode may have multiple steps where the level of door movement increases. Initially the door may only shut a small amount when it has registered a pet has left the area. When the pet approaches the door opens by the same small amount to the completely open position. This gives the pet all the visual and odour cues that food is present and they can become accustomed to some door movement. In additional training steps the degree to which the door closes is increased until in the final operating mode the door shuts fully when the pet is not present and no food odour is sensed by the pet. However by this time the pet is fully trained in the operation of the feeder and this is no longer a difficulty. FIG. 11 illustrates an example of such a training mode.

The transition between training steps where the degree of door movement (and thus a portion of an aperture and/or food bowl to be covered in a following door closure step) is changed may be carried out by the pet owner, as would be the case for the method shown in FIG. 11. For example the owner may press an input means such as a switch or button, to transition between training steps and increase the level of door movement. Alternatively the transition between training steps may be carried out automatically, for example in response to the number of times the pet has fed from the feeder of the total amount of time the feeder has been in the training mode. Such a process would have the advantage that the owner simply sets the unit into a training mode and does not need to change the settings again as it would automatically transition into normal operation.

Figure 12:
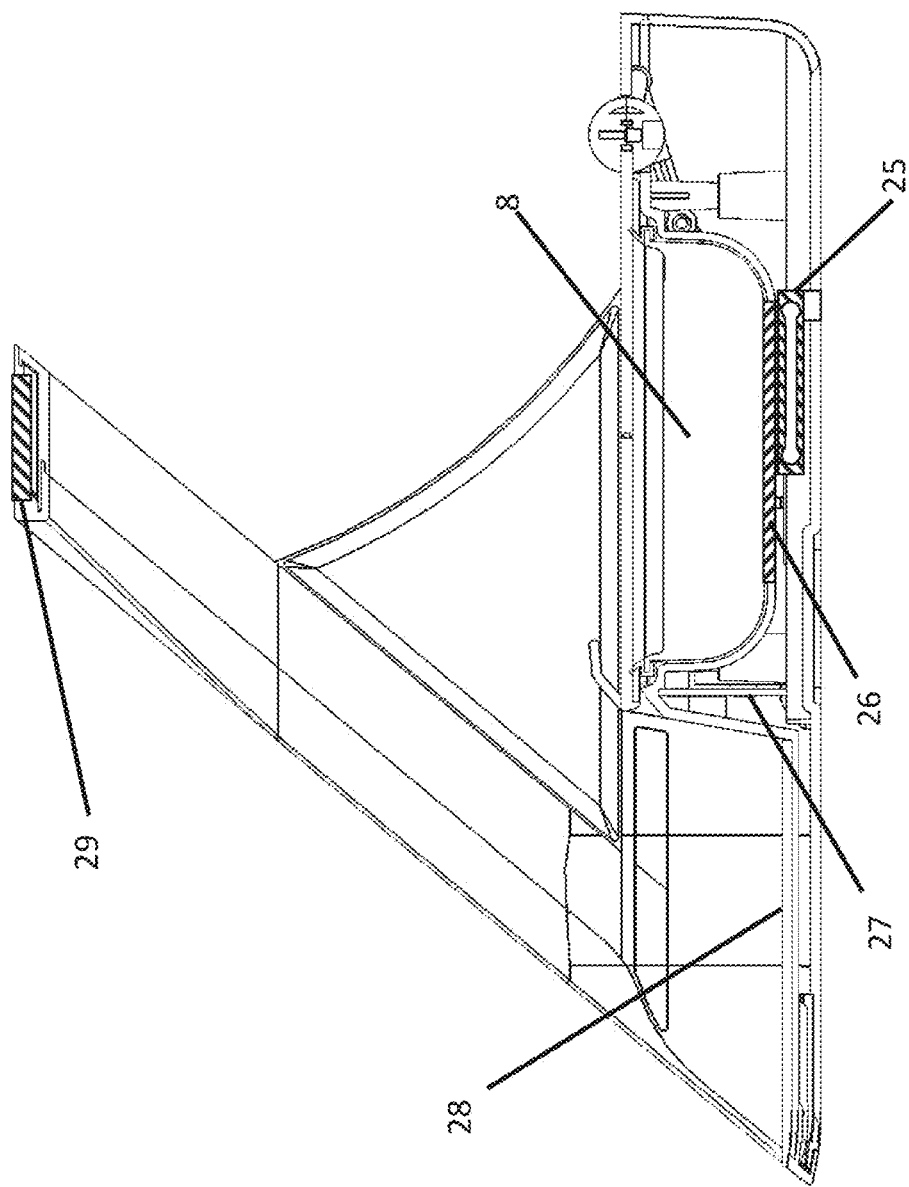
FIG. 12 shows a pet feeder with load cell to weigh a food bowl and its food contents.

FIG. 12 shows a cross section view of a selective feeder. This feeder incorporates a load cell 25 that is connected between the base of the feeder and a platform 26. The food bowl sits on the platform. The load cell is wired to the PCB 27 onto which circuitry is placed that determines the weight on the load cell. When food is loaded into the food bowl its weight is registered and stored. After each feed the bowl is also weighed to determine how much food has been eaten by the pet. Information describing how much food has been eaten by one or more pets may be displayed on a (user) interface such as display screen 29. Such information may be beneficial when managing the weight of one or more pets in the household. It is noted that this arrangement would also be suitable for a non-selective feeder with no loop antenna. In this case the food may be weighed but no pet identification carried out. Such an arrangement may be most suited to households with one single pet using the feeder.

FIG. 12 also shows a removable mat 28 that is placed in the region in front of the food bowl. Such a mat facilitates cleaning of the feeder as it can be easily removed and any excess food spilled in this region may be cleaned off. It is a characteristic of many pets feeding habits for this region in front of the food bowl to be prone to mess.

Figure 13:
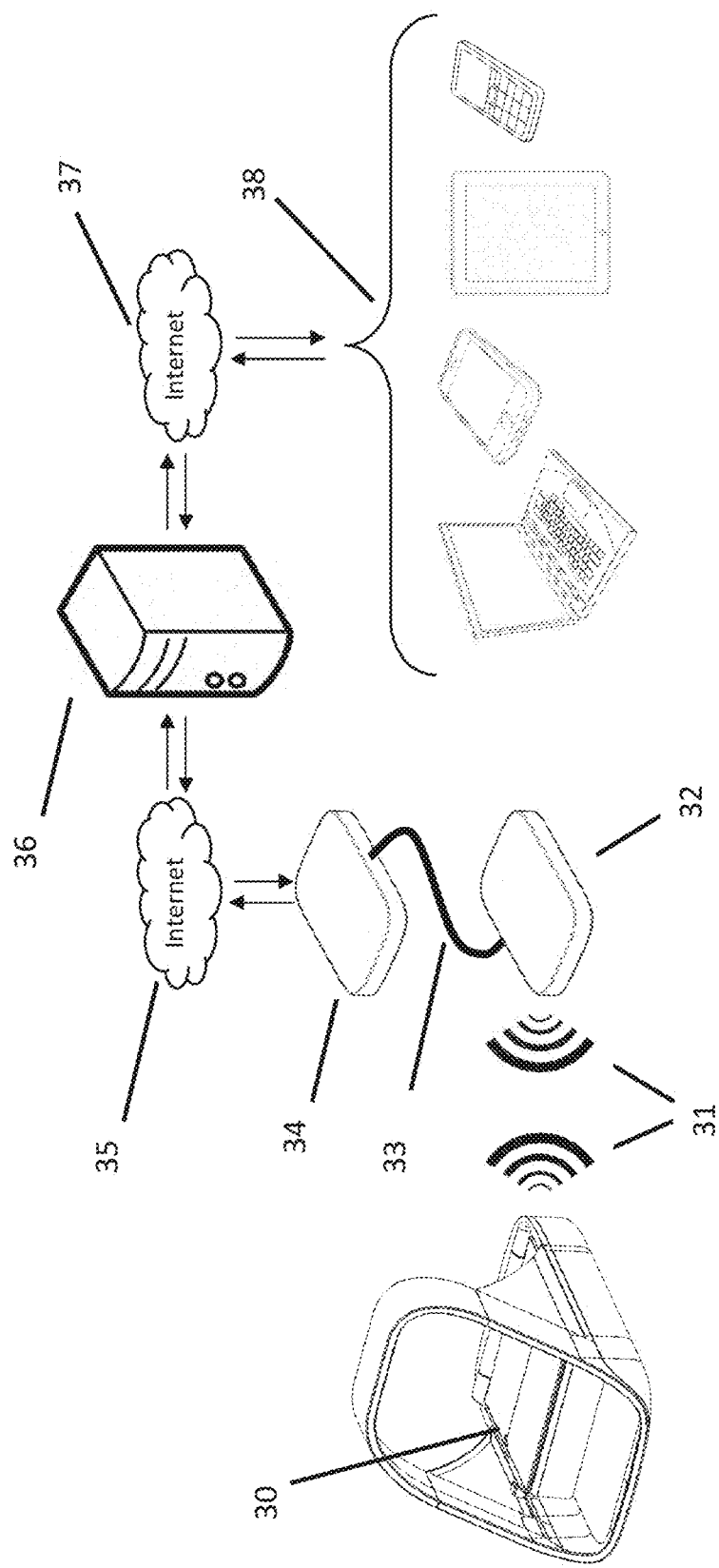
FIG. 13 shows a system where the pet feeder is connected to the internet.

FIG. 13 shows a feeder 30 which may have a load cell to determine the amount of food consumed by one or more pets. The feeder also includes a radio card that communicates data over a radio link 31 to a hub 32. The data transmitted may include statistics on feeding including feeding times, number of feeds, and amount of food consumed by at least one pet. The feeder may be a selective or non selective feeder. The hub is connected to an internet modem 34 which connects to the internet and updates a remote server 36 with the feeding data. It is noted that a number of alternative arrangements may achieve the same goal of feeding data on a remote server. For example the feeder may be directly connected to the internet over a wired, Wi-Fi, or cellular connection.

The owner may access the information on pet feeding through a number of different channels or devices 38, including a website, app on a mobile device, SMS messages, Twitter feed, Facebook update, or any other commonly used channel. Any one of more of such channels or devices may be or comprise an animal feeding monitor. The owner may be presented with a summary of the amount of food one or more pets has consumed and compared to a recommended amount of food for a weight control diet. The information may be combined with other information for example from an activity monitor or a pet door monitor reporting the level of outdoor activity taken by the pet. The combined information may deliver a weight control program or be used for any other medical purpose for one or more pets.

Figure 14:
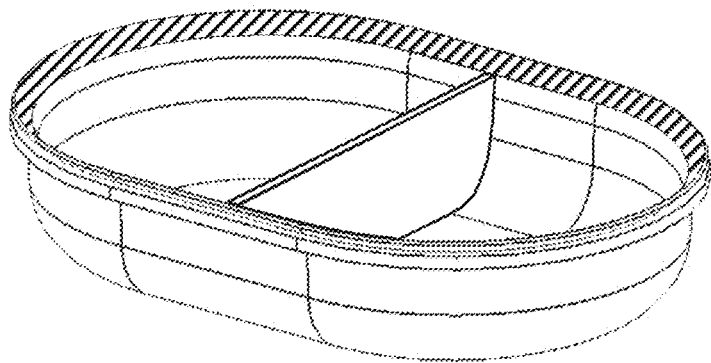
FIG. 14 shows a food bowl with a split compartment.

FIG. 14 shows a bowl that has a dividing wall within it giving two separate compartments. Such a split bowl allows the pets to be fed with two types of food, such as wet or dry food. Alternatively it allows the pets to be fed from one compartment and have water available through the other compartment. The bowl is shown with one overall seal, similar to FIG. 4. An alternative is to also attach a seal to the dividing wall so that each compartment is sealed against a closed door.

Whilst the embodiments presented show a feeder with a single bowl or a split bowl, an alternative to this is to use multiple compartments. Such compartments may each have their own door that can open to a pet. Alternatively there may be one door and the compartments move under that door to present different compartments to the pet. Multiple compartments may be used to feed one or more pets over multiple days. Alternatively they may be used to deliver specific meals to multiple pets within the same household. This allows specific feeding of multiple pets without the need to purchase multiple feeders.

Other alternatives for food bowls include the use of disposable food bowls. Alternatively the pet food may be supplied in a package by the food manufacturer that fits the space available for the food bowl. The package may be placed either inside the food bowl, benefiting from the air tight seal of the food bowl, or alternatively the food bowl may be removed and the package put in its place. The packaging may include an integrated flexible seal. Such a product may be beneficial for the customer as they have less requirement to handle pet food.

Figure 15A:
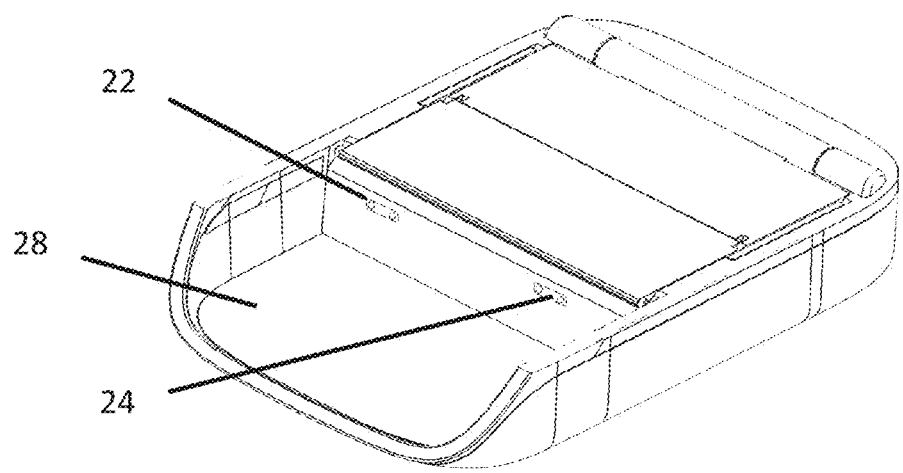
FIG. 15A shows an example of non-selective pet feeder with a tray.
Figure 15B:
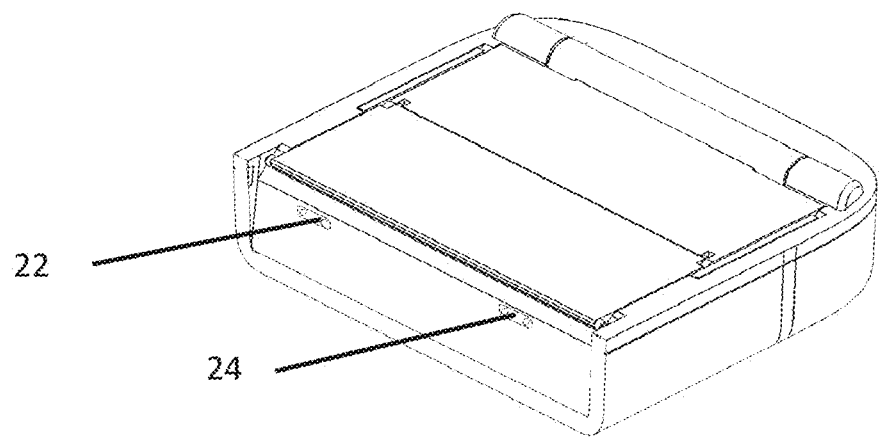
FIG. 15B shows another example of non-selective pet feeder without a tray.
Figure 16:
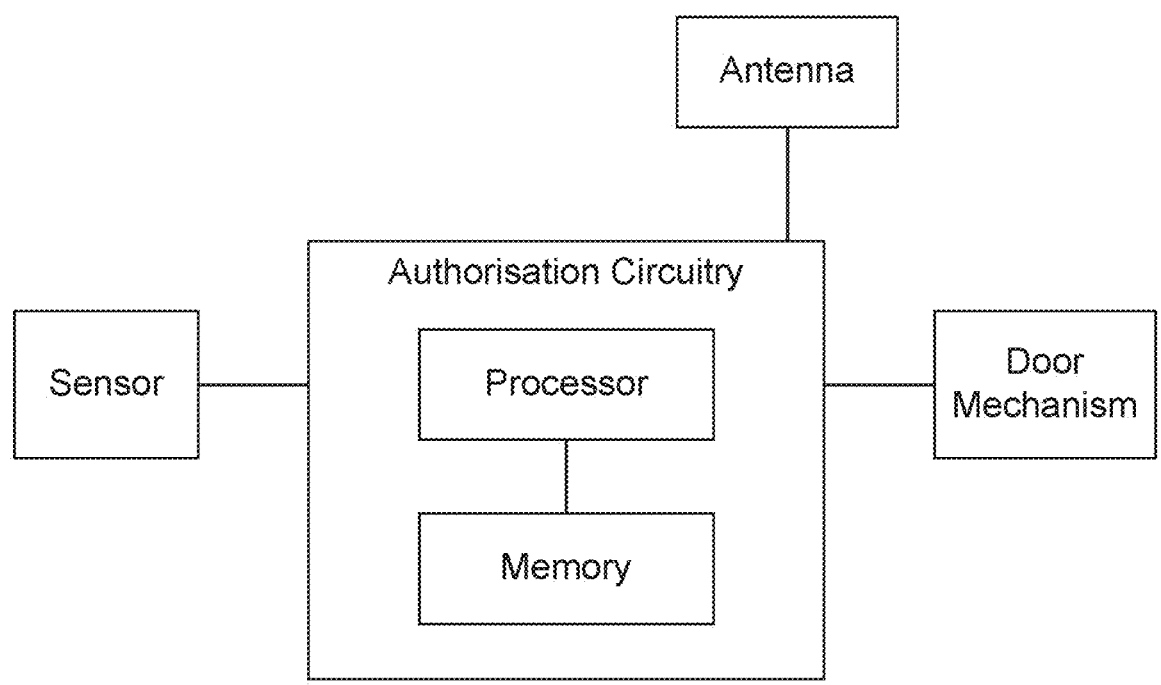
FIG. 16 shows authorisation circuitry which may be comprised within any part of an animal feeder, e.g., within the housing.

FIG. 15 shows embodiments of non-selective feeders. These feeders may include bowls with flexible seals as described for previous embodiments. Also they are shown with 2 part doors driven from a rear hinge as previous embodiments. They do not include a loop antenna as no RFID read is carried out during their operation. Instead these feeders operate by detecting the presence of a pet attempting to feed. The detection is carried out with the proximity detectors 22 24. FIG. 15A shows a feeder that includes a tray in front of the bowl and a removable mat 28 on the tray. FIG. 15B shows a feeder with no tray or mat, which results in a more compact object.

Considering further the above detailed description, some preferred embodiments are described below. Any one or more of these preferred embodiments may be combined together within one feeder.

In a 'sealed bowl' embodiment, the pet feeder opens when a pet is required to be fed. The feeder incorporates a door that can move between opened and closed and a removable bowl into which pet food may be placed. A flexible seal is attached to the bowl such that when the door is closed it is in contact with the seal providing an air tight compartment for the food inside. This will keep the food inside fresher for longer and minimise problems with flies and odours. When replacing food the removable bowl is generally taken out of the product and cleaned. As such the flexible seal is cleaned regularly which keeps it in good working order. Alternatively the flexible seal may instead be attached to the casework of the pet feeder.

In a two-part door embodiment, a feeder door is comprised of two parts hinged in the middle. When closed the two parts lie flat in the same plane forming a flat door over the top of the bowl. There may be a flexible seal attached to the edge of either or both of the doors where they meet when they are closed. This flexible seal may provide an air tight contact between the doors so that the seal to the bowl is air tight.

Such a door may be driven from a pivot on the back edge of the rear door piece. As this is rotated from horizontal towards vertical the 2 part door hinges in the middle and the air tight seal between the two parts breaks. Furthermore the air tight seal to the bowl breaks. Such a break in the door facilitates making and breaking the air tight seal to the bowl. Without this a door that rises up from the bowl when opening may become stuck to the bowl through suction.

The two part door construction also facilitates a compact design of feeder as it folds up to a small dimension when open, and is preferable to a solid door.

The opening and closing action of the door may be designed to move over the top of the bowl but not make contact until close to the final closing of the door. This will minimise the chance of becoming stuck on food that has been dropped on the feeder.

The final motion of the door when closing over the top of the bowl may be designed to have a significant degree of vertical movement so that it compresses on to the flexible seal below.

The action of the door when opening may be designed to avoid excessive early vertical motion that could hit a pet on the underside of the chin if the door opens during its approach to the feeder. Instead the door may raise enough to break the seal to the bowl (by separating at least a region of the seal from the door, additionally or alternatively similarly breaking a seal at an interface between door parts) and preferably), rise above the bowl for clearance and then move backwards away from the pet. The feeder may additionally include 'push arms'; that tune the motion of the end of the door when opening and closing to achieve the required motion profile.

The movement of the door may be such that it rests on a rail or on optional push arms when it is moving from open to closed. The resting contact may be preferable to a constrained channel or fixing prescribing the motion of the door. Now if a pet's paw is left in the way of a closing door, the door may rise above the paw and avoid injury by pinching the paw, as would be the case for constrained motion. The final motion of the door may pull the door down onto the seal and also constrain the front edge of the door. This may make the door harder to open by a persistent pet looking to gain access. The final motion may take place after the leading edge of the door has either passed the front edge of the bowl or at least come close enough so that no paw can be put in the way of the door. In this manner the door is only locked into its final position after any danger of injuring a pet has been removed.

A multi-part door construction with more than 2 parts hinged together may also be used, achieving the benefits identified above. Flexible seals may be attached between one or more of the doors to achieve an air tight seal to the food compartment.

In a 'restricted access' feeder embodiment, the structure of the feeder may provide good read range, limit side access and/or open design. The feeder may restrict access by animals wanting to steal food while the authorized pet is feeding, without resulting in an enclosed feeding experience for the pet that can be claustrophobic or otherwise cause stress to the pet. The feeder may incorporate an antenna for reading an electronic tag or RFID implant in the pet. The antenna may be situated towards the front of the feeder such that the animal pokes through the antenna when they approach to feed. The side portions of the antenna may be situated to limit side access by an unauthorised animal. The feeder may further incorporate side guards to limit access by an unauthorised animal. These side guards may be transparent to allow the pet to easily view around them and minimise perceived enclosure of the feeding space.

In such a 'restricted access' feeder, the door may be of a 2 or more part construction and fold up to the rear of the feeder when open. This folded up door may provide a barrier to unauthorised access at the rear. As a result there is little enclosure of the feeding space before the pet approaches, giving an attractive open design and an unintimidating space to the pet. When the pet approaches and is feeding the space may be enclosed to some degree all round, giving the pet access to the food while stopping unauthorised access.

In a 'proximity-operated' embodiment, the feeder may incorporate one or more proximity sensors to detect the approach of a pet wanting to feed. When a pet is detected the feeder may open or alternatively it may activate a tag reader to identify the pet and open if it is an authorised pet. The power drain for the feeder may be reduced by sensing the proximity of a pet in a low power mode and only transferring to a higher power mode to read the identity of a pet once the proximity of the pet is confirmed.

The proximity sensors may be infrared reflection sensors that detect the amplitude of a reflection from the pet, indicating the presence of a pet when a threshold is exceeded. This threshold may be adjustable. Multiple sensors may be included such that a pet presence is indicated when a sub-set of all the sensors exceed a threshold. Such an approach may lead to a more reliable detection of a pet that is less prone to confusion if one or more of the sensors becomes blocked. Such a blockage may result from dropped food on a sensor. Additionally one or more of the reflection sensors may be monitored and if the returned signal corresponds to a blocked sensor then its signal may be discarded until it recovers to a level corresponding to an unblocked sensor.

The reflection sensors may be direct reflection sensors whereby the backscatter from the pet is detected at the same angle as the outgoing light. In addition, the reflection sensors may be used across the area over which the pet is to be detected. Here the sensor and emitter 'beams' cross in front of the bowl where the pet is to be detected. Such crossed sensors can provide information on how close the pet is to the bowl and a decision made whether to activate the tag reader. To minimise power wastage from sensing an animal walking in front of the feeder, rather than approaching for a feed, the crossed sensors may be required to be triggered first. Direct reflection sensors may be employed as a reliable measure of whether the pet is still in the vicinity of the feeder.

In a 'training' embodiment, the feeder may incorporate a training mode. Some features of the feeder when in operation may prevent the pet from initially being happy to use the feeder such as the lack of a food odour indicating the presence of food, or the motion or noise of the door being startling to the pet when they are not used to it. The training mode may provide degrees of door closing so that the pet can get used to the feeder. Initially the door may be open completely and the pet allowed to feed from the bowl with no noise or movement from the door. In a training stage the door may close partially and open fully when the pet approaches to feed. A number of different training stages may be included so the motion of the door increases close to the final motion of the door to a fully closed and open position. In all the training stages the door is not fully sealed onto the bowl when in the 'closed' position which gives the pet the odour of the food to attract it and indicate the presence of food. Only when the final stage has been completed and the feeder is used in its final operating mode is the bowl fully sealed and the food odours minimised.

Transitions between training stages may be carried out manually by a pet owner or may be carried out automatically.

In a 'networked' embodiment, internet capability and/or weigh scales may be provided. The feeder may incorporate a wireless link, such as a radio link, so that it may be remotely controlled and/or provide status information. The wireless link may also link to the internet to allow the control or status information to be controlled from another location.

Such a feeder may include a load cell that weighs the amount of food in the bowl and can determine the food provided to the pet and the amount of food consumed by the pet. This information may be passed over the wireless link to the internet and collated. Once collated the information may be used to manage the pet's weight or some other medical purpose.

Figure 17:
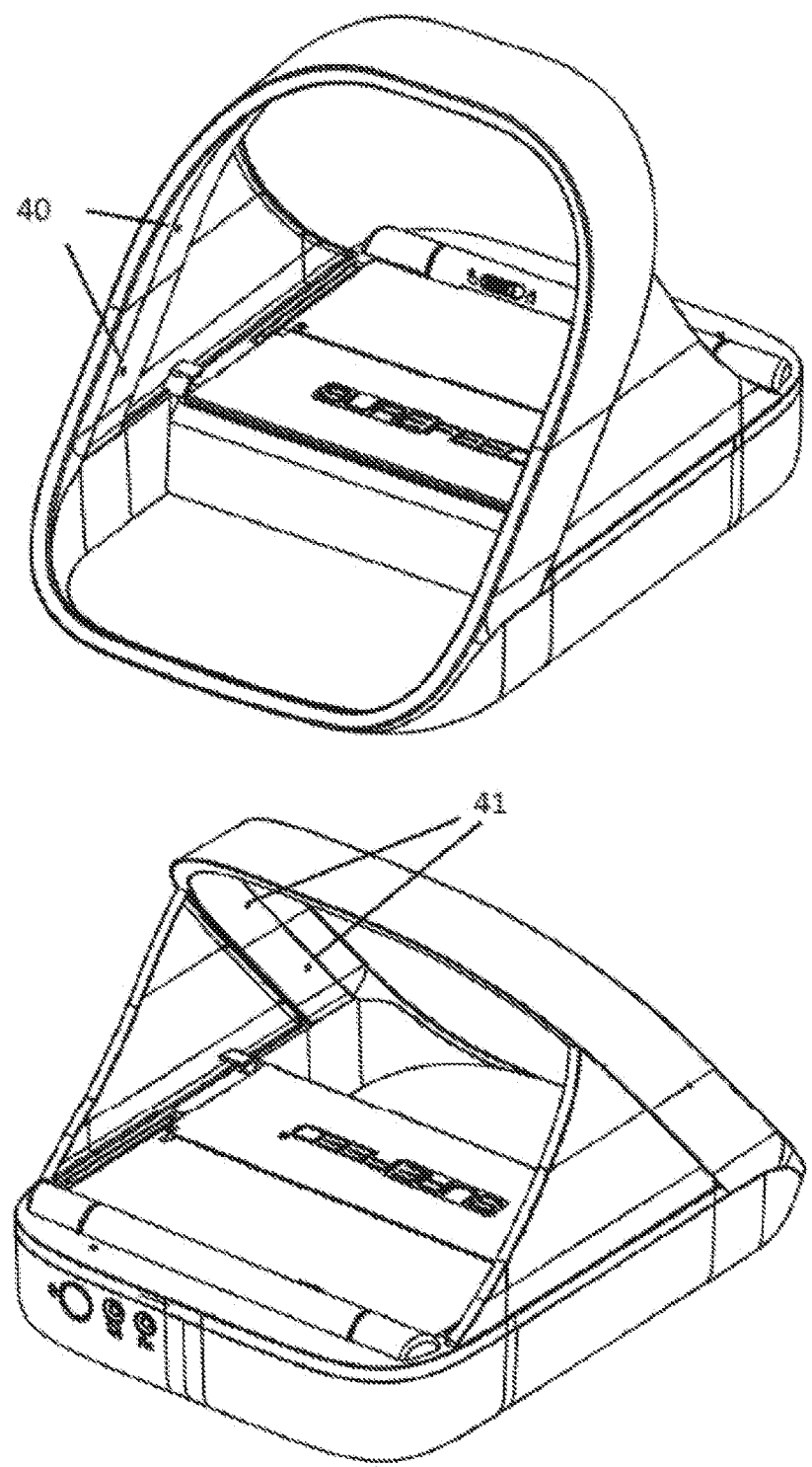
FIG. 17 shows a further embodiment of a pet feeder.

FIG. 17 shows a further embodiment of a pet feeder, which may be combined with features of embodiments disclosed above. This embodiment includes a pet sensor to detect the approach of a pet, the sensor comprising at least one pair comprising an infrared emitter 40 and infrared receiver 41, e.g., two pairs as represented by infrared emitters 40 and infrared receivers 41 in FIG. 17. One (e.g., the top) emitter transmits to a corresponding (e.g., the top) receiver and when interrupted by the approach of a pet the drop in signal may be registered. The unit may then scan the pet's microchip and open for an authorised pet. Similarly another (e.g., the lower) emitter transmits to a corresponding (e.g., the lower) receiver and when interrupted the approach of a pet may be registered. The use of multiple pairs (two or more) of emitters and sensors may be advantageous when detecting the approach of different sized animals. The interruption method used with these sensors has the advantage that it does not rely on the quality of optical reflection from a pet that may be highly dependent on their type of fur and colour.

In any embodiment the feeder may incorporate a method to reduce the chance of an unauthorised animal eating from the feeder as follows:

When a pet is feeding the unit may repeatedly scan the pet's microchip or collar tag to ensure it is still the authorised pet who is eating. In order to conserve battery life this repeated scan may be done every few seconds rather than continually. If the ID number has changed then the feeder may close the door to stop an unauthorised pet from eating who may have displaced the authorised pet; and/or If no number is read but a relatively high level of signal is from the microchip is picked up then two microchipped pets may be feeding at the same time. In this case the feeder may be closed; and/or If no number is read and the signal from the microchip is registered at a relatively low level then an unchipped unauthorised animal may have displaced the authorised pet and the feeder may be closed.

In any embodiment the feeder may incorporate an alternative/further method to help stop unauthorised animals from gaining access to the food. This method may similarly be incorporated in combination with features of any previously described methods/feeders and is described as follows:

If the pet moves away, wait a pre-set time, continuing to test the proximity detector; and/or If the proximity detector is triggered before the pre-set time then re-scan the pet's microchip. If the microchip number of the authorised pet is picked up then do not close the door as the authorised pet is feeding again. If the microchip number of an unauthorised pet is picked up then close the door as the authorised pet has been displaced.

Use of this method may lead to a faster closing for the door in the presence of an unauthorised pet compared to the previously described periodic re-scanning of the pet's microchip during normal operation, depending on the rate of periodic re-scanning.

If no microchip is picked up with such a re-scan the door may be kept open as it may be the authorised pet's microchip is hard to read. In this case having the door close on the authorised pet may have an undesirable effect.

However if it is advantageous that no unauthorised pet can eat from the feeder, such as may be the case where a medicated diet is being delivered, then the door may be closed when no microchip is picked up.

If the proximity detector is not triggered within the pre-set time then the feeder may re-scan for the authorised pet's microchip. If the authorised pet is still picked up then the pet is still in the vicinity of the feeder and the door may be kept open. The feeder may continue to wait for the pre-set time again until the pet moves away from the feeder.

The pre-set time may be adjustable, for example with a switch or rotary knob, depending on how quickly the door should close after a pet has moved away. If the pet's normal behaviour is to back away from the food bowl to eat, then returning for more food then a relatively long time may be better. However if there are known unauthorised pets trying to steal food from the feeder then a shorter time may be better.

In a further embodiment similarly combinable with any features of previously described methods/feeders the feeder may incorporate further solid restrictions to access by unauthorised pets wanting to steal food. Examples of such restrictions include:

1) A shroud around the back of the unit to stop the approach of a pet from the rear; and/or
2) Side restrictions to limit the width of front access to the food. This may make it harder for two pets to feed at the same time.

These solid restrictions may be part of the product or optional removable parts. Making the parts removable may assist in the training of pets to use the feeder so that it has an open design during initial use and is only restricted when it has been accepted by the pet.

In any of the above preferred, or other, embodiments, any one or more of the following example features may be incorporated in the feeder:

1) The bowl may have a split compartment so that both wet and dry food can be delivered from the same unit;
2) The feeder may comprise multiple food bowls allowing multiple meals to be delivered to the pet over a day or multiple days. A timer may be included for this purpose. Alternatively different bowls may be served up to different pets depending on their identification. In this way multiple pets may be selectively fed from one unit, eliminating the need for more than one selective feeder in a multi-pet household;
3) A tray may be included in front of the bowl in the region where the side access to the bowl is controlled. An optional mat may be included with the tray to ease cleaning of the unit;
4) Food bowls may be disposable; and/or
5) Food may be packaged by the food manufacturer for use in the food bowl, eliminating the need for a separate bowl. In this case the owner does not need to handle the food, only opening up a package and placing it in the feeder. The packaging may include a flexible seal. The packaging may be disposable after the food has been eaten by the pet.

Thus, preferred embodiments may be defined as below:
Training Mode
1) Use of training mode where door moves by increasing degrees to get pet used to it.

2) Final movement of door is (substantially) air tight on the bowl so pet does not have odour cues for knowing food will be there. Pet happy to use without these cues as undergone training.

2 Part Door
1) Multi-part door construction with hinges in between.
2) Door driven from the back hinge.
3) Air tight seal between adjacent parts of the door.
4) Opens up towards the back meaning final size is small and whole feeder is compact.
5) When opening, the front edge of the door moves back away from pet so it doesn't hit them in the head when opening.
6) Tune motion of the door with 'push arms' to put over the top of the bowl, so no jamming of door.
7) Last motion of the door is to pull the end down to lock the end into place. Also push down onto a flexible seal on the chassis or bowl to make food compartment air tight.
8) Multi-part door construction combined with sealed bowl such that when opening the initial motion of the door results in the seal breaking to the flexible seal. Means the door will not become stuck to the seal through suction.
9) When moving normally, the door rests on a casework or push arm so that it is unconstrained. Avoids pinching a pet's paw if left in the bowl.
10) Only tie to a locked final state once there is no room for a paw to be put into the way of the bowl.

Unauthorized Animal Control (Selective Feeder Only)
1) Base of antenna situated in front of the bowl making it easier to read pet's tag
2) Side portions of antenna block side access of unauthorized animal.
3) Side guards to further block side access of unauthorized animal.
4) Use of door opening to form a barrier to unauthorized access from the back of the feeder unit.

Sealed Bowl
1) Use of flexible seal to make food compartment air tight.
2) Seal on removable bowl so easy to wash
3) Use of a split bowl for 2 types of food or water and food.

Operation
1) Use of proximity sensors, including infrared reflection sensors.
2) Low power mode in proximity sensing and high power mode for RFID read and door moving.
3) Multiple proximity sensors so that can still operate if some become blocked with food.
4) Use of a learn mode to get the list of authorised pets.

Remote Access/Weigh Scales
1) Use of load cell to weigh the food
2) Report feeding data including food weight consumed to a remote device.
3) Use to manage weight or medical condition
4) Deliver via web page, app, mobile, etc.

Other
1) Incorporation of a tray in front of the bowl to capture spilled foods.
2) Use of a removable mat on the tray.
3) Multi-compartments for multiple meals to be delivered. Possibly in combination with a timer.
4) Use of multi-compartments to deliver different meals to different authorized pets. In combination with selective feeder.
5) Disposable food bowls
6) Bowl incorporated in the packaging of the food by the manufacturer.
7) Inclusion of a flexible seal in manufacturer packaging of food.

Any one or more of the above numbered features under any one or more of the above headings (Training Mode, 2part door, . . . Other) may be combined in any embodiment.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of training an animal to use an animal feeder having a housing comprising an aperture for a food bowl and having a door for covering the aperture, wherein the door is movable between an open position and a closed position, the animal feeder comprising a door mechanism to control movement of the door over the aperture to open and close the door, the method comprising:
   detecting, with a sensor of the animal feeder, when an animal has moved away from the aperture;
   in a first training step of a training mode of the animal feeder, controlling the door with the door mechanism to move toward the closed position in response to one or more said detections that said animal has moved away from the aperture, stopping at an intermediate position between the open and closed positions thereby to cover a portion of the aperture;
   in one or more later training steps of the training mode of the animal feeder, controlling the door with the door mechanism to move toward the closed position in response to one or more later said detections that said animal has moved away from the aperture, stopping at a position between the intermediate and closed positions thereby to cover a portion of the aperture larger than the preceding said portion.

2. The method of claim 1, wherein the animal feeder comprises at least one input means to receive a user input, wherein the method comprises transitioning the animal feeder between the plurality of training steps in response to a series of one or more said user inputs.

3. The method of claim 1, further comprising in response to a last one of the one or more later said detections, controlling the door with the door mechanism to fully cover the aperture and form a seal between the door and housing to thereby reduce food odour detectable outside the feeder when the feeder contains food.

4. The method of claim 1, wherein in said training mode the method comprises transitioning the animal feeder to a next one of the plurality of training steps automatically in response to a total amount of time the animal feeder has been in the training mode.

5. The method of claim 1, wherein in said training mode the method comprises transitioning the animal feeder to a next one of the plurality of training steps automatically in response to a predetermined number of detections.

6. An animal feeder having a housing comprising an aperture for a food bowl and having a door for covering the aperture, the feeder comprising a door mechanism to control movement of the door over the aperture, wherein:
   the door has foldable portions; and
   the door mechanism is configured to control the door such that the foldable portions fold to raise the foldable portions to a higher level above the aperture than an edge of the door, the edge of the door thereby moved such that the door uncovers at least a portion of the aperture, wherein the foldable door portions are adjacent to each other and the door comprises a hinge which directly couples said adjacent foldable door portions with each other and the hinge is between said adjacent foldable door portions, the hinge is such that, when the door mechanism controls the door to fully cover the aperture, the foldable door portions form a flat door over the aperture, and when the door mechanism controls the door to uncover at least said portion of the aperture, the adjacent foldable door portions are folded in a concertina-like fashion.

7. Animal feeder of claim 6, comprising a flexible seal at an interface between adjacent said door portions, the interface having a said hinge, the flexible seal to seal the interface when the door mechanism controls the door to fully cover the aperture.

8. Animal feeder of claim 6, wherein the door mechanism is configured to control the door such that a said foldable portion of the door flattens, the edge of the door thereby moved such that the door covers at least a portion of the aperture,
    wherein the feeder comprises at least one arm to support the door during part of said edge movement to cover at least the portion of the aperture, the arm to thereby prevent the edge of the door contacting the housing during the edge movement.

9. Animal feeder as claimed in claim 8, the feeder configured to such that an end portion of the door moves in contact with the housing during a later part of a said edge movement, the end portion comprising said edge of the door, the door configured such that, when an obstruction to the later part of the edge movement is present, the door edge is liftable over the obstruction.

10. Animal feeder as claimed in claim 6, comprising a latch configured to pull the door onto the aperture at the end of a movement of the door edge to cover the aperture.

11. Animal feeder of claim 10, wherein the feeder has a flexible seal and the latch is configured to pull the door onto the seal to thereby reduce food odour detectable outside the feeder when food is in the bowl aperture.

12. Animal feeder of claim 11, wherein the door mechanism is configured to separate a region of the door from the seal to thereby allow the door to move to uncover the aperture.

13. Animal feeder as claimed in claim 7, wherein the door mechanism is configured to separate a region of a said door portion from a said flexible seal at a said interface between the door portion and an adjacent said door portion, to thereby allow the door to move to uncover the aperture.

14. Animal feeder as claimed in claim 6, wherein the door mechanism is located at an edge of the feeder.

\* \* \* \* \*